United States Patent
Tooher et al.

(10) Patent No.: US 10,547,354 B2
(45) Date of Patent: Jan. 28, 2020

(54) METHODS, SYSTEMS AND DEVICES FOR WIRELESS TRANSMIT/RECEIVE UNIT COOPERATION

(71) Applicant: IDAC HOLDINGS, INC., Wilmington, DE (US)

(72) Inventors: J. Patrick Tooher, Montreal (CA); Benoit Pelletier, Roxboro (CA)

(73) Assignee: IDAC Holdings, Inc., Wilmington, DE (US)

( * ) Notice: Subject to any disclaimer, the term of this patent is extended or adjusted under 35 U.S.C. 154(b) by 31 days.

(21) Appl. No.: 16/066,466

(22) PCT Filed: Dec. 28, 2016

(86) PCT No.: PCT/US2016/068943
§ 371 (c)(1),
(2) Date: Jun. 27, 2018

(87) PCT Pub. No.: WO2017/117253
PCT Pub. Date: Jul. 6, 2017

(65) Prior Publication Data
US 2019/0020381 A1    Jan. 17, 2019

Related U.S. Application Data

(60) Provisional application No. 62/273,250, filed on Dec. 30, 2015.

(51) Int. Cl.
*H04W 4/00* (2018.01)
*H04B 7/026* (2017.01)
(Continued)

(52) U.S. Cl.
CPC ........ *H04B 7/026* (2013.01); *H04W 72/0406* (2013.01); *H04W 72/0446* (2013.01);
(Continued)

(58) Field of Classification Search
CPC ..................................................... H04B 7/026
See application file for complete search history.

(56) References Cited

U.S. PATENT DOCUMENTS 9,055,521 B2   6/2015  Iwasa
9,439,176 B2   9/2016  Maaref et al.
(Continued)

FOREIGN PATENT DOCUMENTS

EP       2733881 A1    5/2014
WO    2010/150050    12/2010

OTHER PUBLICATIONS

Huawei et al., "Support for UE Cooperation in NR," 3GPP TSG RAN WG1 Meeting #85, R1-164379, Nanjing, China (May 23-27, 2016).

(Continued)

*Primary Examiner* — Gerald A Smarth
(74) *Attorney, Agent, or Firm* — Volpe and Koenig, P.C.

(57) ABSTRACT

A method for transmitting data using a two-phase cooperation that includes a first sharing phase and a second cooperative phase is provided. In an embodiment, a method for cooperative data transmission performed by a first WTRU is disclosed. The method includes receiving, by the first WTRU from an eNB, cooperative set configuration information including a cooperative set identification. In the sharing phase, the first WTRU may receive from the eNB, a resource assignment for a first data transmission. During the sharing phase, the first data transmission may be transmitted using resources indicated in the received resource assignment. A second data transmission may be received from a second WTRU during the sharing phase. On a condition the second data transmission is successfully received by the first WTRU, a third data transmission may
(Continued)

be transmitted, in cooperation with the second WTRU, during the cooperative phase.

19 Claims, 10 Drawing Sheets

(51) Int. Cl.
    *H04W 72/04*     (2009.01)
    *H04W 88/04*     (2009.01)
    *H04W 72/14*     (2009.01)
    *H04B 7/0413*     (2017.01)

(52) U.S. Cl.
    CPC ........... *H04W 72/14* (2013.01); *H04W 88/04* (2013.01); *H04B 7/0413* (2013.01)

(56) References Cited

U.S. PATENT DOCUMENTS

| | | | |
|---|---|---|---|
| 2010/0331037 A1* | 12/2010 | Jen | H04W 52/146 455/522 |
| 2011/0041027 A1 | 2/2011 | Fong et al. | |
| 2013/0029680 A1 | 1/2013 | Park et al. | |
| 2013/0272174 A1 | 10/2013 | Park et al. | |
| 2013/0286882 A1 | 10/2013 | Lim et al. | |
| 2014/0126551 A1 | 5/2014 | Nammi et al. | |
| 2014/0177456 A1 | 6/2014 | Boudreau et al. | |
| 2015/0071193 A1* | 3/2015 | Seo | H04L 1/1692 370/329 |
| 2015/0341874 A1 | 11/2015 | Nguyen-Dang | |
| 2015/0349924 A1 | 12/2015 | Wang et al. | |
| 2016/0128123 A1 | 5/2016 | Li | |
| 2016/0226643 A1* | 8/2016 | Mallik | H04L 5/0055 |

OTHER PUBLICATIONS

Huawei Technologies, "Vision on 5G Radio Access Technologies," 3GPP RAN Workshop on 5G, RWS-150006, Phoenix, USA (Sep. 17-18, 2015).
Jafarkhani, "A Quasi-Orthogonal Space-Time Block Code," IEEE Transactions on Communications, vol. 49, Issue 1 (Jan. 2001).
Luan et al., "Distributed Joint Cluster Formation and Resource Allocation Scheme for Cooperative Data Collection in Virtual MIMO-Based M2M Networks," International Journals of Antennas and Propagation, vol. 2015, 10 pages (Mar. 2015).
Qualcomm, "5G Views on Technology & Standardization," 3GPP RAN workshop on 5G, RWS-150012, Phoenix, USA (Sep. 2015).
Qualcomm, "5G Waveform & Multiple Access Techniques," (Nov. 4, 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.1.0 (Sep. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.5.0 (Sep. 2016).
Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.0.0 (Sep. 2016).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.11.0 (Sep. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.3.0 (Sep. 2016).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.9.0 (Mar. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.3.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.11.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.3.0 (Sep. 2016).
ZTE, "Considerations on 5G Key technologies & Standardization," RWS-150024 (Sep. 2015).

* cited by examiner

METHODS, SYSTEMS AND DEVICES FOR WIRELESS TRANSMIT/RECEIVE UNIT COOPERATION

CROSS REFERENCE TO RELATED APPLICATIONS

This application is the U.S. National Stage, under 35 U.S.C. § 371, of International Application No. PCT/US2016/068943 filed Dec. 28, 2016, which claims the benefit of U.S. Provisional Application No. 62/273,250 filed Dec. 30, 2015, the contents of which is hereby incorporated by reference herein.

BACKGROUND

Mobile communications are in continuous evolution and are already at the doorstep of a fifth generation (5G) era. As with previous generations, new use cases largely contribute in setting the requirements for new systems. Future networks may be designed with an emphasis on uniform user experience over an entire geographic area. Such a user experience may be exemplified by uniform achievable throughput, latency and/or reliability.

With respect to the issue of uniform experience, a wireless transmit/receive unit (WTRU) in a poor coverage area may use repetition to improve performance. However, repetition degrades achievable throughput and increases over-all latency. This is due, at least in part, from the fact that a repeating WTRU must use additional resources which could have been made available for use elsewhere. Additionally, the additional resources used by the repeating WTRU and not resources best spent because of the high likelihood that the WTRU will again fail to successfully retransmit in the poor coverage area.

For low power nodes, such as wireless sensors or massive low cost machine type communication (LC-MTC) devices, it is desirable that a battery of the device is long lasting, for example, many years. Repetition may prematurely drain the battery and cause an LC-MTC device to become unreachable or unable to continue transmitting. Furthermore, future networks may have a very high density of WTRUs. For example, sensor network deployments, wearables or at specific occasions, for example, a full stadium scenario, may lead to a highly dense layer of WTRUs. On the other hand, extreme rural scenarios exist wherein base station deployment may be minimal and far dispersed. Rural scenarios may be beneficial for a mobile operator since a low deployment cost may be a business goal.

Methods which leverage the high density of deployed WTRUs to improve a uniformity of a transmission or reception experience may be beneficial. Additionally, exploiting inherent features of a high density of deployed WTRUs may lead to benefits beyond making the experience of a WTRU more uniform. For example, in the example of massive broadband at a full stadium, it is possible that the data transmitted to many WTRUs is very similar. In such a scenario, it may be desirable to use the benefits of having multiple WTRUs closely located to improve the over-all performance.

In view of the above, more user-centric deployments may be beneficial. Such user centric deployments may be ad hoc and may be manifested as multiple cells cooperating, in one embodiment, in a transparent manner to a WTRU, or as multiple WTRUs in cooperation. WTRU cooperation may enable clusters of closely located WTRUs to improve individual performance by acting as a distributed antenna array. Therefore, WTRU cooperation may help exploit the advantages of dense clusters of WTRUs by improving cell edge WTRU performance, limiting over-all battery drain and also improving massive broadband transmission. Data redundancy may also be improved, since more copies of identical data may exist and be shared in the network.

To achieve beneficial WTRU cooperation, embodiments disclosed herein provide methods for determining how appropriate sets of WTRUs may cooperate. Furthermore, appropriate cooperation may require multiple WTRUs to efficiently share their data, for example, sharing of received data from an evolved Node B (eNB), or sharing of data to be transmitted by each WTRU to an eNB. Methods and systems for implementing efficient cooperative WTRU transmission are also addressed.

SUMMARY

A method for transmitting data using a two-phase cooperation that includes a sharing phase and a cooperative phase is provided. The method includes sharing data, in the sharing phase, among a cooperating set of wireless transmit/receive units (WTRUs), and cooperatively transmitting the data, in the cooperative phase, by the cooperating set of WTRUs to a destination node.

In another example, a method for transmitting data using a two-phase cooperation includes cooperatively receiving data, in a cooperative phase, by a cooperating set of WTRUs from a source node, and sharing the data, in a sharing phase, among the cooperating set of WTRUs.

A method for transmitting data using a two-phase cooperation that includes a first sharing phase and a second cooperative phase is provided. In an embodiment, a method for cooperative data transmission performed by a first WTRU is disclosed. The method includes transmitting, in the first transmission phase, from the first WTRU to at least one second WTRU, data for cooperative transmission and receiving, by the first WTRU from at least the second WTRU, in response to transmitting the data for cooperative transmission, an acknowledgement of either successful or unsuccessful decoding of the data. On a condition the acknowledgement indicates successful decoding of the data by the second WTRU, retransmitting the data, in the second transmission phase, to an eNB, in cooperation with the second WTRU is provided.

A method for cooperative data transmission performed by a first WTRU is disclosed. The method includes receiving, by the first WTRU from an eNB, cooperative set configuration information including a cooperative set identification. In the sharing phase, the first WTRU may receive from the eNB, a resource assignment for a first data transmission. During the sharing phase, the first data transmission may be transmitted using resources indicated in the received resource assignment. A second data transmission may be received from a second WTRU during the sharing phase. On a condition the second data transmission is successfully received by the first WTRU, a third data transmission may be transmitted, in cooperation with the second WTRU, during the cooperative phase.

BRIEF DESCRIPTION OF THE DRAWINGS

A more detailed understanding may be had from the following description, given by way of example in conjunction with the accompanying drawings wherein.

DETAILED DESCRIPTION

Figure 1A:
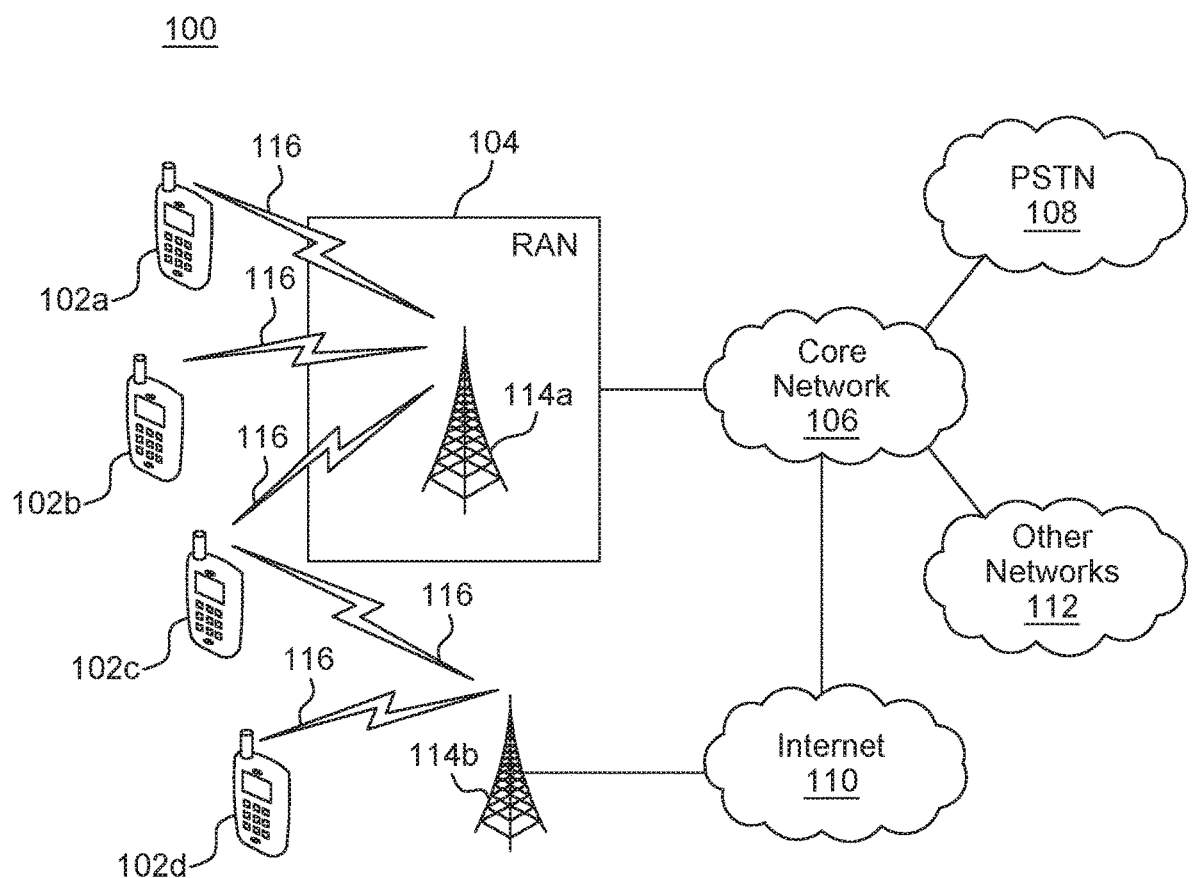
FIG. 1A is a diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (IP) (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
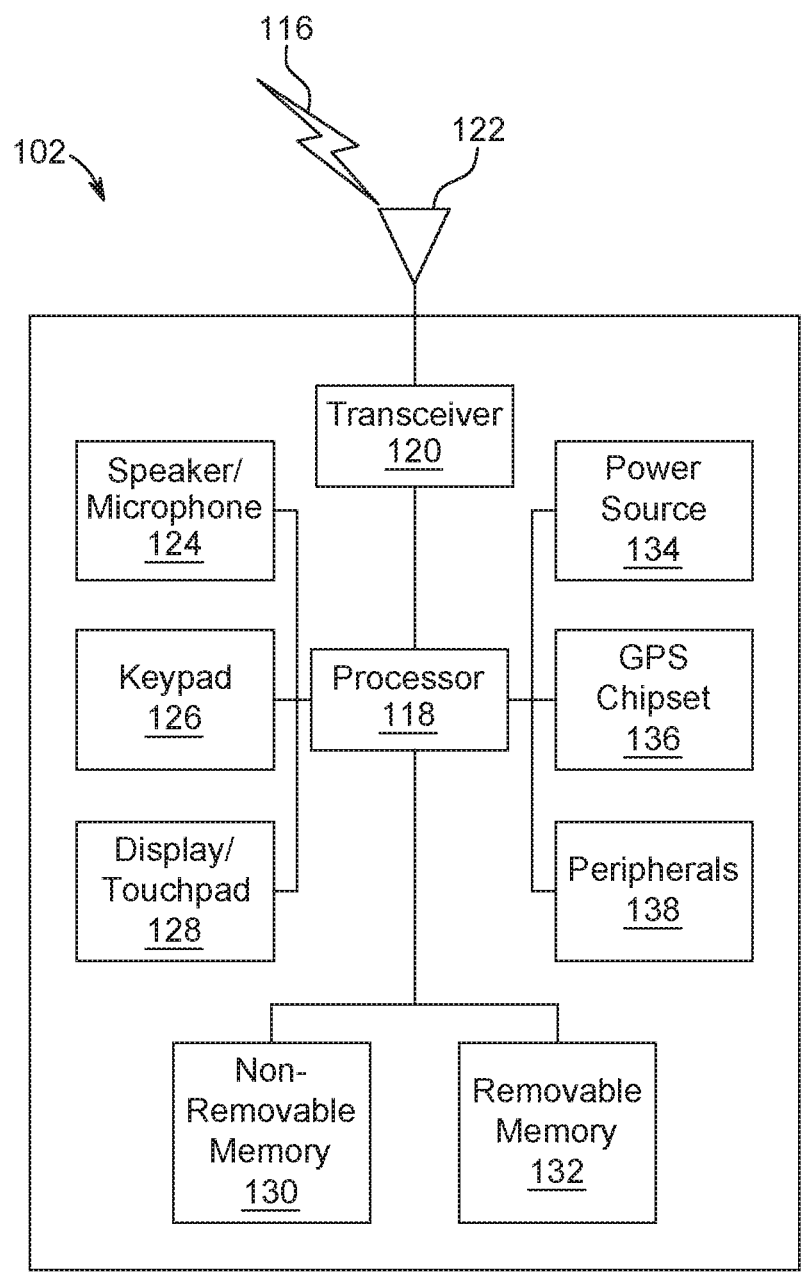
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
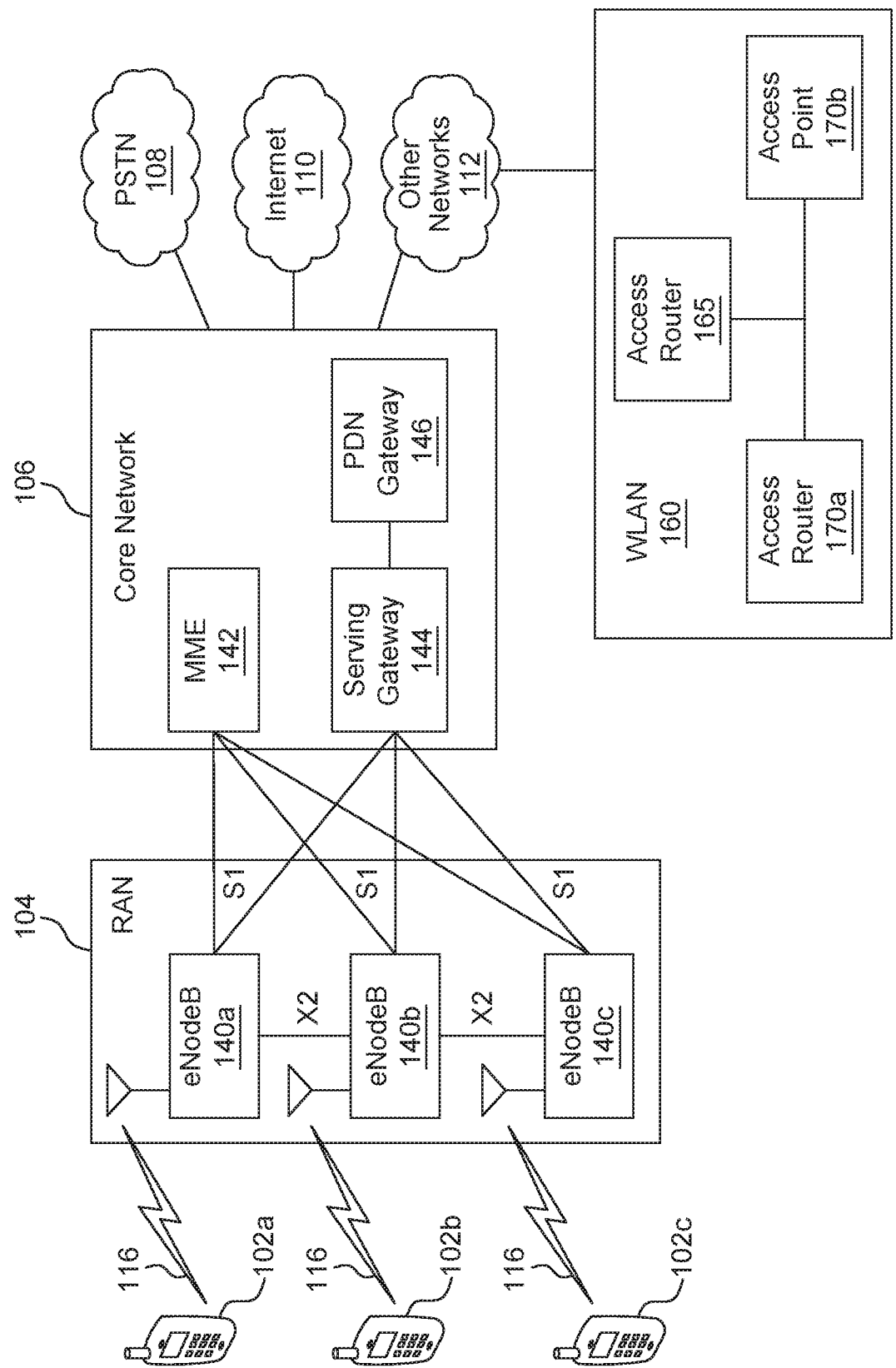
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based WLAN 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

It is expected that the 5G air interface may be applied to improved broadband performance (IBB); industrial control and communications (ICC) and vehicular applications, vehicle to vehicle (V2V) or vehicle to everything (V2X); and massive machine-type communications (mMTC). Thus, the 5G air interface may provide support for ultra-low transmission latency, ultra-reliable transmission, machine-type communications (MTC) operations, including narrowband operations, and spectrum operating mode (SOM).

In order to support ultra-low transmission latency, an air interface latency as low as a 1 ms round trip time (RTT) may require support for TTIs somewhere between 100 us and (no larger than) 250 us. Support for ultra-low access latency, for example, time from initial system access until the completion of the transmission of the first user plane data unit, may also be provided. At least industrial control (IC) and V2X require end-to-end (e2e) latency of less than 10 ms.

In order to support for ultra-reliable transmission, one key design consideration is transmission reliability that is much better than what is possible with legacy LTE systems. A 99.999% or five nines transmission success and service availability is a target for such systems. Another consideration is support for mobility for speed in the range of 0-500 km/h. At least IC and V2X require a packet loss ratio of less than 10e-6.

In order to support MTC operations including narrowband operation, the air interface should efficiently support narrowband operation, for example, using less than 200 KHz, extended battery life, for example, up to 15 years of autonomy, and minimal communication overhead for small and infrequent data transmissions, for example, a low data rate in the range of 1-100 kilobits per second (kbps) with an access latency of seconds to hours.

In order to support a particular spectrum operating mode (SOM), the WTRU may be configured to perform transmissions according to one or more SOMs. For example, a SOM may correspond to transmissions that configured according to at least one of the following: a specific transmission time interval (TTI) duration, a specific initial power level, a specific hybrid automatic repeat request (HARQ) processing type, a specific upper bound for successful HARQ reception/transmission, a specific transmission mode, a specific physical channel (uplink or downlink), a specific waveform type or even a transmission according to a specific RAT, for example, legacy LTE or according to a 5G transmission method. A SOM may correspond to a quality of service (QoS) level and/or related aspect, for example, a maximum/target latency, maximum/target block error rate (BLER) or similar metric. A SOM may correspond to a spectrum area and/or to a specific control channel or aspect thereof including search space, downlink control information (DCI) type, or the like.

Methods, devices and systems for enabling WTRU cooperation in legacy and new wireless systems are provided herein. Multiple WTRUs may cooperate to transmit data to another node, for example, an eNB, WTRU, or the like, or cooperate to receive data from another node, for example, an eNB, WTRU, etc.

For example, a method for transmitting data using two-phase cooperation includes a sharing phase and a cooperative phase such that the method includes sharing data, in the sharing phase by at least one source node, with a cooperating set of WTRUs, and transmitting or retransmitting the data, in the cooperative phase by the cooperating set of WTRUs, to a destination node.

In another example, a method for transmitting data using two-phase cooperation includes a sharing phase and a cooperative phase such that the method includes transmitting data, in the cooperative phase by a source node, to a cooperating set of WTRUs, and sharing the data, in the sharing phase by the cooperating set of WTRUs, with at least one destination node. The data may be transmitted as an uplink (UL) transmission or a downlink (DL) transmission.

A method for transmitting data using two-phase cooperation may include transmitting or retransmitting data received from at least one source node by at least one WTRU of a cooperating set of WTRUs to at least one destination node, such that the WTRUs of the cooperative set of WTRUs cooperate to transmit the data to the destination node.

A method for transmitting data using two-phase cooperation comprising a first phase and a second phase may include transmitting or retransmitting data received from at least one source node by at least one WTRU of a cooperating set of WTRUs to at least one destination node, such that the WTRUs of the cooperative set of WTRUs cooperate to receive the data from the source node.

The methods may also include establishing a cooperative set of WTRUs configured to transmit and/or receive data using the two-phase cooperation comprising the sharing phase and the cooperative phase.

A method for transmitting data may include establishing a cooperative set of WTRUs configured to transmit and/or receive data using a two-phase cooperation protocol including a sharing phase and a cooperative phase, such that the establishing of the cooperative set of WTRUs includes transmitting, by a first WTRU, a request for the cooperative set of WTRUs to an eNode-B, receiving, by the first WTRU, a cooperating set configuration from the eNode-B, and forming, by the first WTRU, the cooperative set of WTRUs based on the cooperating set configuration.

A method for transmitting data may include establishing a cooperative set of WTRUs configured to transmit and/or receive data using a two-phase cooperation including a sharing phase and a cooperative phase, such that the establishing of the cooperative set of WTRUs includes transmitting, by a first WTRU, an indication for forming the cooperative set of WTRUs directly to a second WTRU, receiving, by the first WTRU, an acknowledgement (ACK) from the second WTRU that the second WTRU will join the cooperative set of WTRUs with the first WTRU, and forming, by the first WTRU, the cooperative set of WTRUs based on the received ACK, wherein the cooperative set of WTRUs includes the first and the second WTRUs. The methods may include reporting, by the first WTRU, the established cooperative set of WTRUs to an eNode-B. The methods may include receiving, by the cooperative set of WTRUs, data that includes a plurality of subsets of data, such that each WTRU of the cooperative set of WTRUs receives at least one subset of the plurality of subsets of data, sharing, by the cooperative set of WTRUs, the plurality of subsets among the WTRUs of the cooperative set of WTRUs such that each WTRU of the cooperative set of WTRUs has all the plurality of subsets of data and cooperatively transmitting, by the cooperative set of WTRUs, the data shared among the cooperative set of WTRUs to a destination node such that at least one WTRU of the cooperative set of WTRUs transmits the data to the destination node.

The cooperative transmission may include the cooperative set of WTRUs determining which WTRU or WTRUs of the cooperative set of WTRUs transmits the data to the destination node. Alternatively, the cooperative transmission may include a cooperating set master WTRU of the cooperative set of WTRUs determining which WTRU or WTRUs of the cooperative set of WTRUs transmits the data to the destination node.

The methods may include transmitting, by the cooperative set of WTRUs, at least one ACK to a source node that the data is received, and ceasing, by the source node, transmitting the data based on receiving a threshold number of ACKs.

A method for transmitting data may include receiving, by the cooperative set of WTRUs, data that includes a plurality of subsets of data, such that each WTRU of the cooperative set of WTRUs receives at least one subset of the plurality of subsets of data, and sharing, by a WTRU of the cooperative set of WTRUs, the at least one subset of the plurality of subsets of data a threshold number of times with other WTRUs of the cooperative set of WTRUs prior to cooperatively transmitting the data.

A method for transmitting data may include cooperatively receiving, by the cooperative set of WTRUs from a source node, data that includes a plurality of subsets of data, such that at least one WTRU of the cooperative set of WTRUs receives the data from the source node, and sharing, by the cooperative set of WTRUs, the plurality of subsets among the WTRUs of the cooperative set of WTRUs. The cooperative receiving, by the cooperative set of WTRUs from the source node, of the data may include each WTRU of the cooperative set of WTRUs receiving at least one subset of the plurality of subsets of data. The sharing of the plurality of subsets among the WTRUs of the cooperative set of WTRUs may include sharing such that each WTRU of the cooperative set of WTRUs has all the plurality of subsets of data. Each WTRU of the cooperative set of WTRUs may share its received data with the other WTRUs of the cooperative set of WTRUs in a time division multiplexing manner or in a simultaneous manner.

The data may have a cooperative subframe configuration having a plurality of regions. The plurality of regions may include at least two of a first region for control information, a second region for the transmission and/or reception of channels used for sharing of data, a third region for channels used for transmitting feedback of the shared data, a fourth region for channels used for cooperative transmission or retransmission of data and a fifth region for channels used for transmitting feedback of the cooperative transmission or retransmission of data.

Control information may include information relayed to physical layer (PHY) or medium access control (MAC) (MAC/PHY) parameters or capabilities, group information, one or more channel identifiers, modulation parameters, feedback information, beamforming matrix information, resources for transmission or the like. Feedback may include ACK or negative ACK of data reception. Feedback may be in the form of a bitmap wherein each bit represents a portion of the data being acknowledged.

A first WTRU of the cooperative set of WTRUs may share data in a first time slot of a subframe and cooperatively transmit data in a second time slot of at least one of a same subframe or a different subframe. In addition, a second WTRU of the cooperative set of WTRUs may share data in a first time slot of a subframe and cooperatively transmit data in a second time slot of at least one of a same subframe or a different subframe. The first time slot of the second WTRU may overlap with the second time slot of the first WTRU and/or the second time slot of the second WTRU overlaps with the first time slot of the first WTRU.

A plurality of WTRUs may be configured into sets of cooperating WTRUs. Cooperation may be achieved using two-phase transmissions, including a first phase, for example, a sharing phase of sharing data and a second phase, for example, a cooperative phase of (re)transmitting data in a cooperative manner.

Cooperating set WTRUs may share data for both eNB- and WTRU-terminated transmissions, including sharing of data for uplink (UL) transmissions, via enhanced UL grant, and/or sharing of downlink (DL) data, using round-robin retransmissions or joint retransmissions.

During the sharing phase, the WTRU may have successfully received data from one or more source WTRUs. The WTRU may be configured to determine the set of data to transmit in the cooperation phase, which may be a subset of the WTRU own data and the set of successfully received data from the other WTRUs. In one option, the network may also attempt to decode the transmissions from the source WTRUs during the sharing phase. The network may indicate to the WTRUs the set of data it has received correctly via ACK/NACK feedback.

The WTRU may be configured to select the set of data to transmit in the cooperating phase based on the control information, using for example, grants or feedback received from the eNB. In one example, the WTRU may be configured to transmit only data that the eNB has not received correctly during the first (sharing) phase. In another example, the WTRU may be configured to transmit all the data it has received correctly during the sharing phase, unless the eNB indicates that it has received all the data correctly. In another example, the WTRU may be configured to transmit only the data the eNB requests in the cooperating phase via explicit control signaling, provided that the WTRU has decoded the requested data correctly. In one example, the eNB may address or index the data based on the WTRU IDs to which the data belong to within the cooperating set.

Cooperative transmission of data by a set of cooperating WTRUs is further disclosed, including using distributed Space-Time Block Coding, distributed beamforming, and/or distributed MIMO, and/or using distributed retransmissions, which may include new coding schemes such as Fountain codes to enable more dynamic cooperation.

Also provided herein are designs of a cooperative subframe structure, wherein the subframe is divided into sharing and cooperative (re)transmission regions. For example, the subframe may be divided into regions enabling two-phase cooperation, including using time-slots as sharing and cooperative phases.

Also provided herein are methods of using non-orthogonal multiple access to enhance the performance of both sharing and cooperative phases. Also provided herein are methods to determine precoding for cooperative transmissions. It will be appreciated that any combination of the disclosed features and methods may be used in one or more embodiments.

A source refers to a node such as a WTRU or an eNB, which has data to transmit. A buffer status may be determined using an amount of data for transmission. A destination may refer to a node, such as a WTRU, an eNB or a relay, which is the intended receiver of data transmitted by a source. For the case where data may travel through multiple hops of different nodes, the intended final recipient of the data transmission may be deemed the final destination.

A cooperating set may refer to a set of one or more nodes, for example, a WTRU, eNB or relay, which may receive data from one or more source(s) and cooperatively retransmit data to one or more destination node(s). For the case of a multi-hop transmission, a cooperating set may receive data from one or more source(s) and/or one or more other cooperating set(s), and cooperatively retransmit data to one or more destination(s) and/or one or more other cooperating set(s).

Two-phase cooperation may refer to a method to achieve cooperation composed of two phases: a sharing phase and a cooperative phase. It should be noted that the term two-phase cooperation should not be understood as limited to exactly two phases. Two-phase cooperation refers to cooperation using at least two phases.

A sharing phase may be applied for UL and DL transmissions. For UL transmissions, the sharing phase may be the first phase of the two-phase cooperation, where a set of one or more source node(s) shares data with a cooperating set. For DL transmissions, the sharing phase may be the second phase of the two-phase cooperation, where a cooperating set shares or retransmits received data with one or more destination node(s).

A cooperative phase may be applied for UL and DL transmissions. For UL transmissions, the cooperative transmission phase may be the second phase of the two-phase cooperation, where a cooperating set retransmits data to one or more destination(s). For DL transmission, the cooperative reception phase may be the first phase of the two-phase cooperation, where one or more source node(s) transmits data to a cooperating set.

Two-phase cooperation is provided herein such that, for example, multiple WTRUs cooperate to transmit data to another node, for example, an eNB or cooperate to receive data from another node, for example, an eNB.

Figure 2A:
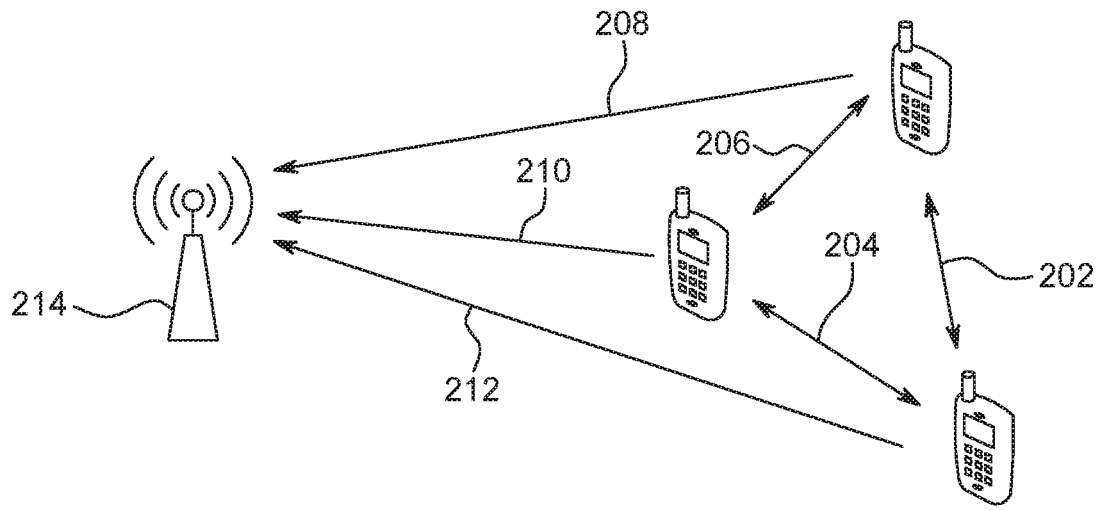
FIG. 2A shows an example of cooperative transmission in an uplink direction.
Figure 2B:
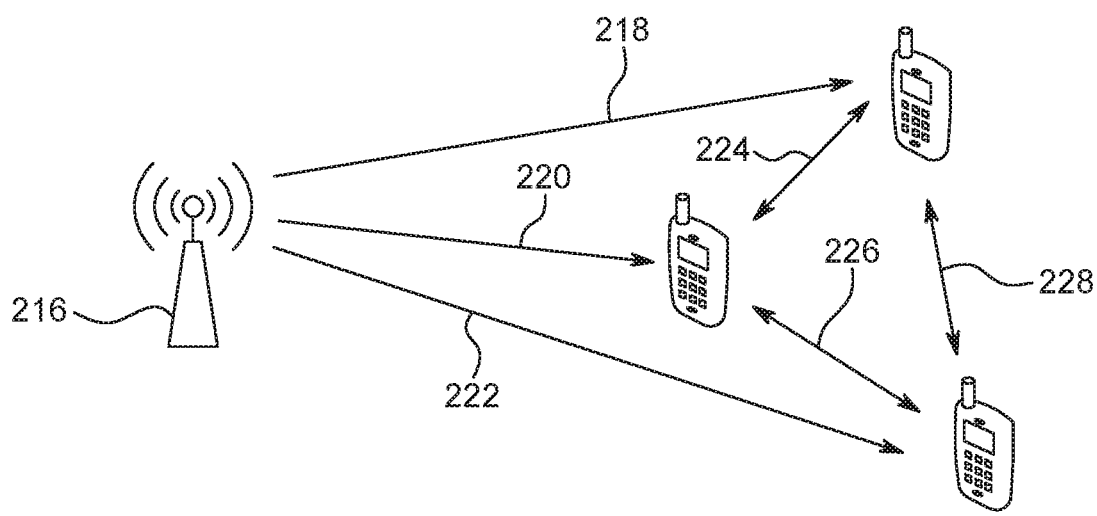
FIG. 2B shows an example of cooperative reception in a downlink direction.

Cooperation may include transmission or retransmission of data from one or more source WTRUs by one or more WTRUs to one or more nodes, for example, an eNB, another WTRU and/or a relay. For example, a WTRU may be helped by a set of cooperating WTRUs to transmit its data to an eNB. FIGS. 2A and 2B show examples of cooperative transmission in UL and DL 200.

FIG. 2A shows an example of cooperative transmission in UL. In a first stage, WTRUs individually share data with each other 202-206, then the WTRUs transmit shared data 208-212 to a node, for example, an eNB 214, another WTRU, or relay node.

Cooperation may also include reception of data from a node, for example, an eNB, another WTRU, a relay, by a set of cooperating WTRUs and retransmission in a cooperative manner to a destination WTRU.

FIG. 2B shows an example of cooperative reception in DL. In the DL direction, transmissions 218-222 begin at the node, for example, an eNB 216, another WTRU, or relay node, and are then transmitted 224-228 to one or more WTRUs.

Cooperation may be used for the transmission or reception of any existing physical channel to or from an eNB, for example, enhanced physical downlink control channel ((E) PDCCH), physical downlink shared channel (PDSCH), physical control format indicator channel (PCFICH), physical hybrid-ARQ indicator channel (PHICH), physical random access channel (PRACH), physical uplink shared channel (PUSCH), physical uplink control channel (PUCCH), to or from another WTRU, for example, using device to device (D2D) channels, to or from a relay. Alternatively, new physical layer channels may be dedicated to the transfer of cooperating information. For example, in the downlink, WTRUs may receive data on a new cooperative PDSCH (CPDSCH). The data transmitted on CPDSCH may be decodable by a set of WTRUs and may be retransmitted to appropriate destination WTRUs, in an embodiment via a new cooperative sidelink. In another example, in the UL, a set of WTRUs may share data, in one embodiment, via the new cooperative sidelink procedures. The set of WTRUs may then transmit the data to a final destination, for example, to an eNB via a new cooperative PUSCH (CPUSCH).

Figure 3A:
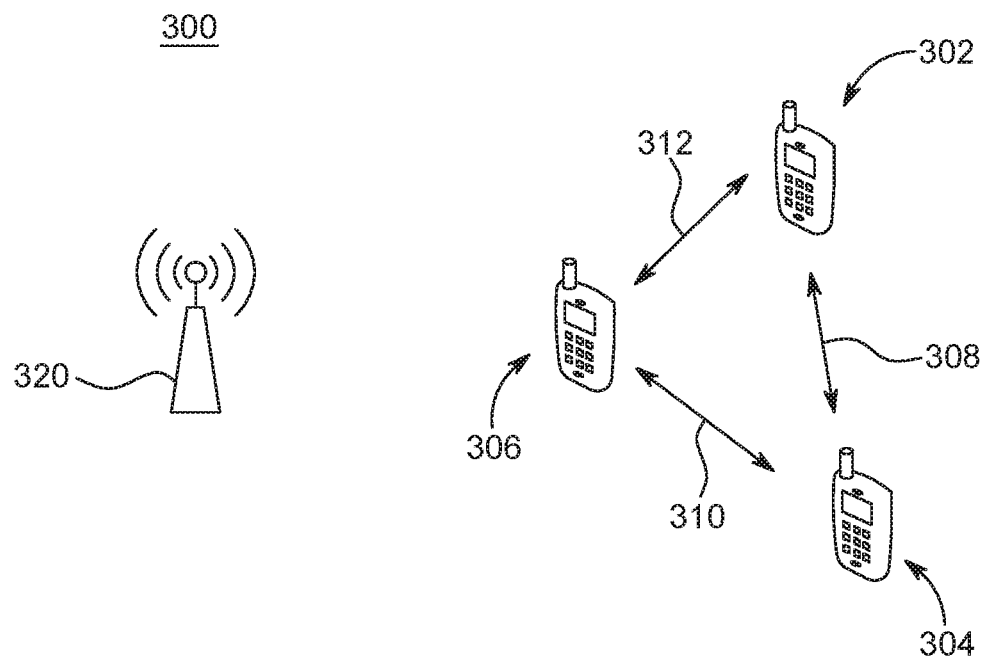
FIG. 3A shows an example of a sharing phase of a two-phase cooperation in an uplink cooperative transmission.
Figure 3B:
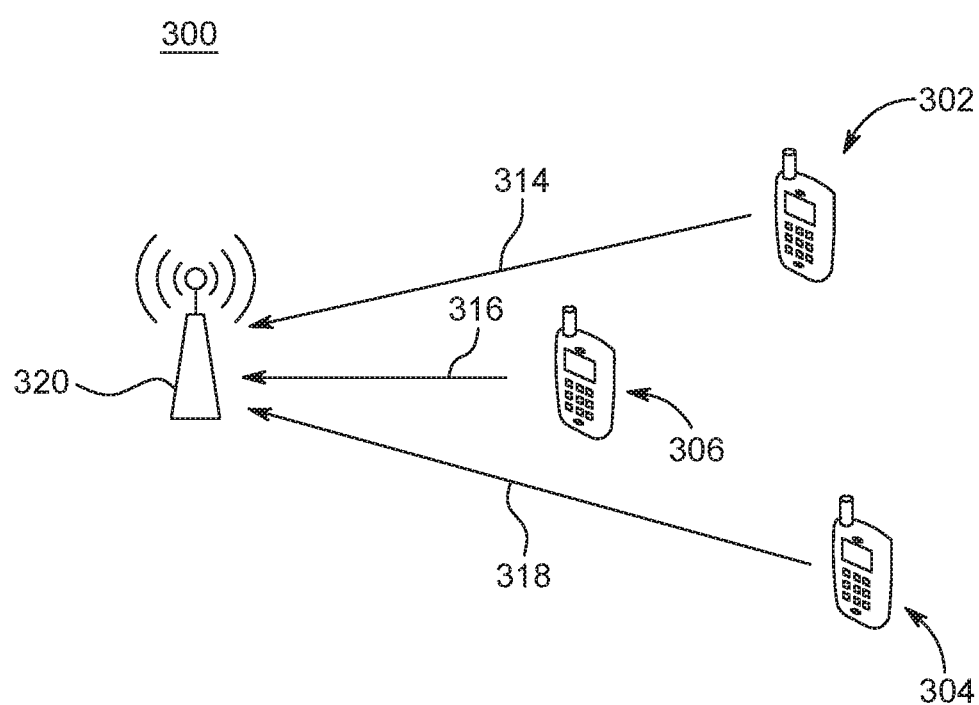
FIG. 3B shows an example of a cooperative phase of a two-phase cooperation in an uplink cooperative transmission.

FIGS. 3A and 3B illustrate examples of two-phase cooperation in the UL 300. Cooperative transmission may be achieved by two phases, a sharing phase and a cooperative phase. In the UL, the sharing phase shown in FIG. 3A is composed of a set of source WTRU(s) 302-306 sharing data 308-312 with a cooperating WTRU set. In this example, the set of source WTRU(s) is equivalent to the cooperating WTRU set. In another example, the cooperating WTRU set may be a superset of the source WTRU(s). Sharing data may involve transmitting source WTRU data in a manner that one or more members of the cooperating set may be capable of decoding it. The cooperating WTRU set may be composed of WTRUs that may or may not themselves be source WTRUs. In the UL, the cooperative phase shown in FIG. 3B may be when the cooperating set of WTRUs 302-306 retransmits data 314-318 to one or more destination node(s), for example, an eNB 320.

In the DL, the two phases may be considered inversed in relation to the example described for the UL. The cooperative phase, for example, the cooperative reception phase, is when a source node, for example, an eNB transmits data in a manner that a cooperating set of WTRUs may be able to decode for one or more destination nodes, for example, one or more destination WTRUs. The sharing phase may be composed of the period in which the cooperating set retransmits data to the appropriate one or more destination node(s).

For multi-hop transmissions, there may be more than two phases. There may be a first phase where one or more source node(s) transmits to one or more cooperating set(s) in, for example, a sharing phase. Then for an n-hop scheme, there may be n−2 phases of cooperative reception and cooperative retransmissions among different cooperating sets in, for example, one or more cooperative phases. Then, there may be a final phase where one or more cooperating set(s) may transmit to one or more final destination node(s) in, for example, a sharing phase.

In another example of a multi-hop transmission, the first phase may be a cooperative phase, followed by one or more sharing phases, followed by a final, cooperative phase.

Sets of WTRUs may cooperate to improve transmission or reception of data. In order to efficiently cooperate, a first WTRU may need to know the set of other WTRUs with which it may cooperate. There may be different cooperating set configurations. A cooperating set may be comprised of WTRUs where at least one WTRU (e.g., a first WTRU) from the set may help transmit and/or receive data for at least one WTRU (e.g., a second WTRU) within the cooperating set. In a second example, a cooperating set may be comprised of WTRUs where at least one WTRU (e.g., a first WTRU) from the set may help transmit and/or receive data for at least one WTRU (e.g., a second WTRU) not within the cooperating set. The second WTRU may be deemed as being served by a cooperating set. The second example may be further defined as multi-hop transmission, where the intended final destination of the transmission is not a part of an intermediary node. For example, a multi-hop may be achieved with a transmission from a source node, for example, an eNB for DL transmissions, to a set of cooperating WTRUs, and then a second transmission from the set of cooperating WTRUs to a final destination node, for example, a WTRU for DL transmissions. A cooperating set may be further characterized by one WTRU acting as a cooperating set master.

A WTRU may be a member of, and/or served by, different cooperating sets for different purposes. For example, a WTRU may be a member of, or served by, a unique cooperating set depending on at least one of: direction of transmission, type of transmission, priority level of transmissions and/or repetition level.

With respect to a transmission direction, for example, UL or DL transmissions, the transmission direction may be defined with respect to a network-terminated direction or a WTRU-terminated direction. A type of transmission may be, for example a data, HARQ A/N, channel state information (CSI) feedback, DCI, UCI, control plane transmission or data plane transmission. A priority level of the transmission may be related to transmissions with low latency and/or high reliability requirements being ranked higher than those with higher latency and/or lower reliability. A repetition level may be defined for cases in which a WTRU may repeat a transmission multiple times to mitigate poor coverage. Retransmission levels may also be defined based on a number of repetitions that are required to complete the transmission.

As an example of the above, a WTRU may be a member of a first cooperating set for UL transmissions with high priority, and the WTRU may be a member of a second cooperating set for UL transmissions with a lower priority. Furthermore, the WTRU may not be a member of, or served by, any cooperating set for all DL transmissions. A priority determination may be made by a WTRU or an eNB or other network device. Priority may be based on traffic type or content. Voice and video traffic may have a higher priority than data or email content.

A cooperating set configuration is provided herein. A WTRU may be a member, or served by, a plurality of cooperating sets. The WTRU may be configured by an eNB with at least one cooperating set, for example, the identity of the other member WTRUs. A WTRU may indicate, for example request, to an eNB that it needs a cooperating set. Such indication may be explicit, and may be at least one of: a new measurement type, a new CSI feedback report, an element in a UCI report, an indication in a random access procedure, for example, in a msg3 transmission, or a new WTRU-probing signal type transmission.

The indication used by the WTRU for requesting a cooperating set may be implicit and may be provided by a selection of a PRACH preamble from a subset reserved for indicating a need for cooperation, a power headroom report or a combination of a scheduling request with an empty buffer. The eNB may transmit to the WTRU cooperating set configuration information, for example upon receiving the indication and/or request from the WTRU for a cooperating set. The cooperating set configuration information may include at least one of: a cooperating set identity; a cooperative set master WTRU identity; a list of member nodes (e.g., WTRUs) in the cooperating set; and/or resources for cooperative transmission. For example, resources may include on which WTRUs within a cooperating set may share data. In another example, resources may include on which WTRUs within a cooperating set may cooperatively transmit data. These resources may be semi-statically configured and may be persistently available to cooperating WTRUs. Resources may include resources for cooperative reception, reference signal configurations, cooperating set specific radio network identifier (C-RNTI) values, a cooperative transmission mode and/or a reference timing for a cooperation phase. Resources for cooperative reception may include, for example, resources on which a WTRU may receive transmissions from a cooperating set. These resources may be semi-statically configured and may be persistently available to cooperating WTRUs. Reference signal configurations. For example, demodulation reference signals or WTRU-specific reference signals. Reference signals may be configured for one or both the cooperative transmission/reception phase and the sharing phase. A cooperating set specific C-RNTI may be employed by one or more WTRUs in a cooperative set. Examples of cooperative transmission modes are described herein. A reference timing for a cooperation phase and/or schedule of a cooperation phase, which includes information for the WTRU to determine the timing and duration of each cooperation phase with respect to a common time reference, for example, a SFN or other source specified.

An exemplary WTRU autonomous cooperation set configuration is provided herein. A set of WTRUs may autonomously form a cooperating set. A WTRU wishing to use cooperative transmission or reception may indicate via a D2D-like broadcasted transmission, for example, via discovery or via a signaling communication mechanism, of its need for, or its ability to perform, cooperative transmission or reception. A WTRU may indicate its ability to perform cooperative transmission by including resources which it may use for sharing and/or cooperative transmission and/or cooperative reception. These resources may be semi-static. The resources may include timing and/or schedule associated to the cooperation phases. A WTRU may further indicate its ability to perform cooperative transmission by including one or more of: available power for cooperation; or an available capacity for cooperation. Capacity may be defined in terms of physical resource blocks (PRBs) and/or subframes per frame. A WTRU may further indicate its ability to perform cooperative transmission by including a path loss or channel characteristics to a destination, for example, for UL transmissions to a destination eNB. Additionally, path loss or channel characteristics from a source, for example, for DL transmissions from a source eNB may be considered. A WTRU may further indicate its ability to perform cooperative transmission by including a cooperative set identifier which may be a cooperative set identifier determined by the WTRU or an identifier associated to the WTRU initiating the cooperative set; and/or the WTRU's ability to be a cooperative set master WTRU.

In response to receiving the indication from the first WTRU to perform cooperative transmission or to form a cooperating set, a second WTRU may acknowledge that it will also join cooperation with a first WTRU. The ACK may be transmitted in a similar manner to the original message, in one embodiment, via a D2D-like broadcasted transmission. In another embodiment, the second WTRU may acknowledge, for example, via an ACK message, the indication from the first WTRU via a transmission on a D2D-like direct transmission link. In one option, the ACK may include the cooperative set identifier.

At least one of the member WTRUs of the cooperating set may indicate the status of the cooperating set to an eNB. Such indication may or may not use cooperative transmission. The status of the cooperating set may be periodically or aperiodically reported to the eNB. The status of the cooperating set may first be indicated via a new cooperative random access procedure.

The status of the cooperating set may include at least one of: a cooperating set identity, a cooperative set master WTRU Identity, cooperating set member nodes, cooperating set sharing resources, and/or a cooperating set cooperation mode.

After transmitting a status of the cooperating set, the WTRUs in the cooperating set may receive from the eNB a cooperating set configuration, similar to that described above for eNB-controlled cooperation set configuration.

Methods to share data between WTRU's are provided. For example, methods for sharing of UL transmissions and methods for sharing DL transmissions are provided.

Methods for sharing of UL transmissions are described below. WTRUs within a cooperating set or being served by a cooperating set may share UL data prior to cooperatively transmitting the data to a destination node, for example, an eNB. Shared data may be considered possibly-independent from per-source WTRU data. For example, every source WTRU may have a set of data that needs to be shared with the cooperating set WTRUs.

WTRUs may be dynamically assigned resources on which they may transmit their data. The assignment information may be in a sharing grant transmitted by another WTRU within a cooperating set. For example, such grant transmission may be centralized and transmitted by a cooperative set master WTRU within a cooperating set.

In another example, a distributed scheduling of sharing resources (i.e., shared resources) may be used. For example, a WTRU may dynamically broadcast control information to cooperating WTRUs, indicating the resources on which it will share data. The broadcasted transmission may use pre-assigned resources. Such resources may have been WTRU-autonomously determined or selected during a WTRU-autonomous cooperating set configuration, or they may have been assigned by an eNB.

An enhanced UL transmission grant may be used for assigning resources to one or more WTRUs. WTRUs may be dynamically assigned resources on which they may transmit their data. The assignment may be in an UL grant transmitted by an eNB. The UL grant may include at least one of: resources to use for the sharing of data with other WTRUs within a cooperating set, that is to say, WTRU-specific resources on which the WTRU may transmit its data; resources to use for the reception of data being shared by other WTRUs; and/or resources to use for the transmission of data to the destination eNB.

The resources may include at least one of a: resource block assignment, time indication, for example, a subframe, time slot, cooperating phase information, or the like, scrambling ID, demodulation reference signal configuration, modulation and coding scheme, precoding information and number of layers and transmission power control.

The UL grant used for sharing data among WTRUs of a cooperating set may be transmitted to the entire set of WTRUs. The information in the grant may be interpreted differently depending on the WTRU. For example, the WTRUs may share data in a time division multiplexing (TDM) manner. In such a case, the UL grant may include information as to when each individual WTRUs within a cooperating set may share their data. In another embodiment, every WTRU within a cooperating set may be pre-configured with a WTRU-specific timing offset, for example, a time between the reception of the UL grant and the sharing of data. Furthermore, all WTRUs within a cooperating set may be aware of the other WTRUs' timing offset, in order to enable appropriate reception of shared data.

WTRUs may receive data shared by multiple WTRUs prior to cooperatively transmitting the data to a destination node, for example, an eNB. In a decode-and-forward embodiment, a WTRU may transmit an ACK to a source WTRU. Upon reception of a pre-determined, and potentially configurable, number of ACK frames or messages, a WTRU may determine that a sufficient number of other WTRUs may cooperatively transmit its data. In that case, a WTRU may not re-share its data. Furthermore, if a WTRU is required to retransmit its data to a destination, depending on the number of cooperating WTRUs that successfully received the data or the number of ACKs received, the WTRU may not need to re-share prior to a cooperative retransmission. On the other hand, if a WTRU has not received a sufficiently large number of ACKs, for example, the number of ACKs received is lower than a configured threshold, on a previous sharing of the data, the WTRU may need to perform sharing again prior to proceeding to a next cooperative retransmission.

For amplify-and-forward type cooperative methods, a WTRU may always re-share its data a configurable number of times with cooperating set WTRUs prior to any cooperative retransmission. In such methods, cooperating WTRUs may combine any and all previously shared transmissions of the transport block, prior to any future cooperative retransmission.

In another example, compress-and-forward may be used by the cooperating set WTRUs. In such a case, the cooperating set WTRUs may exploit the correlation between their data. For example, a set of sensors may have correlated data to transmit. The sharing of data amongst cooperating set WTRUs and to destination may be performed by using source coding with side information at the destination. This may enable an optimal use of sharing resources.

WTRUs within a cooperating set or being served by a cooperating set may share DL data after cooperative reception from a source node, for example, an eNB. WTRUs may be dynamically assigned resources on which they may share data received from a source node, for example, an eNB. The assignment may be in a sharing grant transmitted by another WTRU within a cooperating set. For example, such grant transmission may be centralized and transmitted by a cooperative set master WTRU within a cooperating set.

In another embodiment, a method of distributed scheduling of sharing resources may be used. For example, a WTRU may dynamically broadcast control information to cooperating WTRUs, indicating the resources on which it will share data. The broadcasted transmission may use pre-assigned resources. Such resources may have been WTRU-autonomously determined or selected during a WTRU-autonomous cooperating set configuration, or they may have been assigned by an eNB.

An enhanced DL assignment may be used to configure WTRUs for DL resource reception. WTRUs may be dynamically assigned resources on which they may receive and share their data. The assignment may be in a DL assignment transmitted by an eNB. The DL assignment may include at least one of: resources on which it may receive data from a source node, for example, an eNB; resources to use for the sharing of data with other WTRUs within a cooperating set, that is to say, WTRU-specific resources on which the WTRU may share what it has received from the source; and/or resources to use for the reception of data being shared by other WTRUs.

The resources may include at least one of: resource block assignment, time indication, for example, an indication of a subframe, scrambling ID, demodulation reference signal configuration, modulation and coding scheme, precoding information and number of layers, and transmission power control for the sharing of data.

The DL assignment used for sharing data among WTRUs of a cooperating set may be transmitted to the entire set of WTRUs. The information in the grant may be interpreted differently depending on the WTRU. For example, the WTRUs may share received data in a TDM manner. In such a case, the DL assignment may include information as to when each individual WTRUs within a cooperating set may share their received data. In another example, every WTRU within a cooperating set may be pre-configured with a WTRU-specific timing offset, for example, a time between reception of the DL assignment and/or transmission of data from the source and sharing of data. Furthermore, all WTRUs within a cooperating set may be aware of any timing offsets of the other WTRUs, in order to enable appropriate reception of shared data.

DL data may be shared by WTRUs. In a decode-and-forward cooperative mode, the cooperating WTRUs may receive data from the source for some or all WTRUs in the cooperating set. Upon successfully decoding, a cooperating set WTRU may retransmit all the data it has decoded in a pre-determined or pre-configured or dynamically configured resource. The WTRU-specific sharing resource may be composed of at least one of: resource block assignment, time indication (e.g., subframe), scrambling ID, demodulation reference signal configuration, modulation and coding scheme, precoding information and number of layers, transmission power control.

Figure 4:
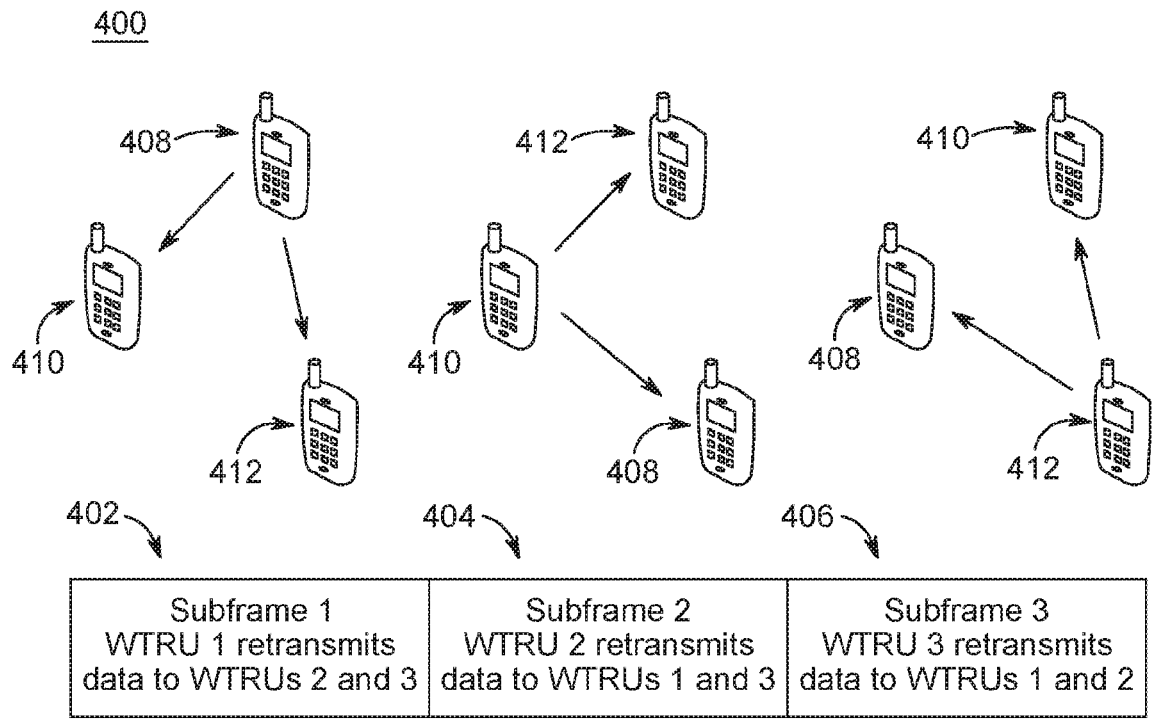
FIG. 4 shows an example of WTRUs of a cooperating set sharing received data in a time division multiplexing (TDM) manner after cooperative reception from a source eNB.

Any data that is not deemed successfully decoded may not be shared by the WTRU. For example, FIG. 4 shows DL data shared among cooperative WTRUs after cooperative reception from source eNB using round-robin transmissions. In another example, FIG. 5 shows DL data shared using joint retransmissions after cooperative reception from source eNB.

In a first example, illustrated in FIG. 4, every WTRU in a cooperating set may share its received data in a TDM manner. For example, as shown in FIG. 4, in a first time instance, for example, subframe 1 402, a first WTRU 408 may retransmit all successfully decoded data for all relevant destination WTRUs 410-412. In a second time instance, for example, subframe 2 404, the second WTRU 410 may retransmit all successfully decoded data for all relevant destination WTRUs 408 and 412 and so on for all the other WTRUs in the cooperating set. In subframe 3 406, for example, the third WTRU 412 may retransmit data to the first and second WTRUs 408-410. In this way, each WTRU has received a communication from all WTRUs in the cooperating set.

Figure 5:
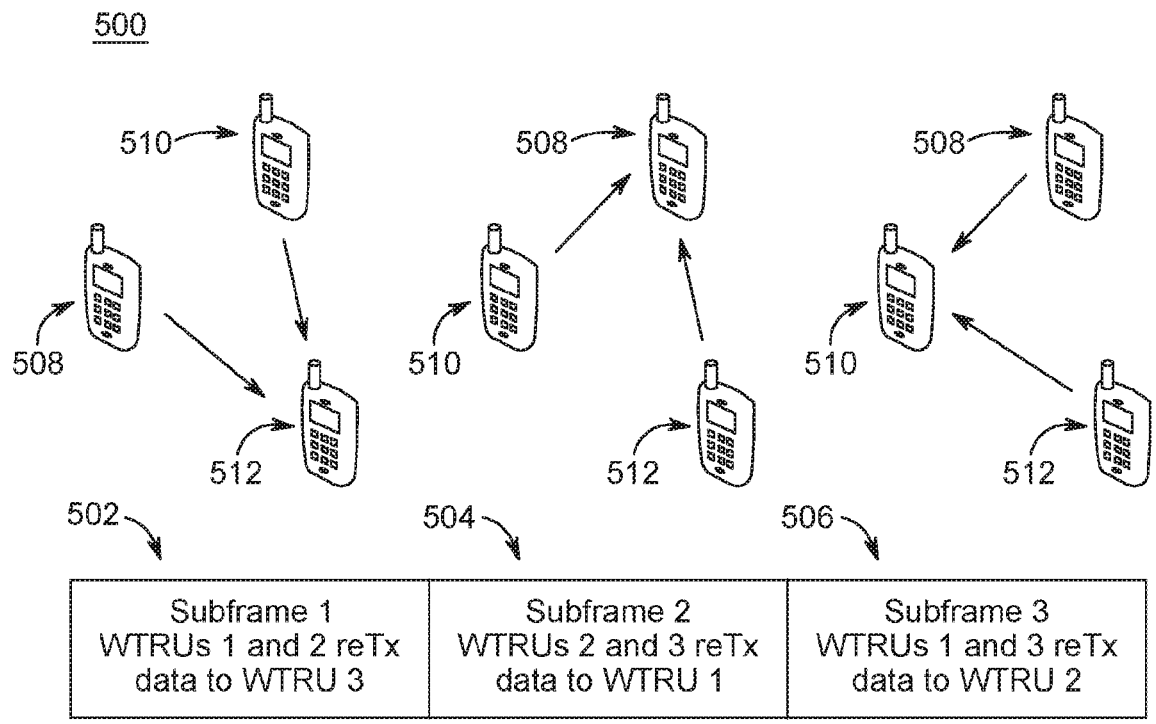
FIG. 5 shows an example of WTRUs in the cooperating set cooperating to share received data using joint retransmissions after cooperative reception from a source eNB.

In a second example, illustrated in FIG. 5, the WTRUs in the cooperating set may cooperate to share the received data 500. There may be specific sharing resources for each source WTRU. In such resources, all cooperating set WTRUs that successfully decoded the transmission for the appropriate source WTRU, may share the data using joint transmission. For example, a subset of cooperating set WTRUs may successfully decode data for a first WTRU; the subset may then share the data in a joint manner in a first sharing resource, for example, in subframe 1 502. In this way, WTRU 1 508 and WTRU 2 510 transmit data to WTRU 3 512 during same subframe 1 502. Similar transmissions may occur as shown in subframe 2 504 and subframe 3 506. In subframe 2 504, WTRU 2 510 and WTRU 3 512 transmit data to WTRU 1 508. In subframe 3, WTRU 1 508 and WTRU 3 512 transmit data to WTRU 2 510. If the appropriate destination WTRU is capable of successfully decoding that data from the transmission from the source, it may preempt any sharing of data by cooperating WTRUs. This may be achieved by allowing all destination WTRUs to first transmit a HARQ A/N before sharing of data among cooperating set WTRUs.

The joint transmission used by cooperating WTRUs may use at least one of: distributed beamforming, distributed space-time coding or distributed multiplexing. Joint transmission among a plurality of WTRUs in a cooperative set may require a calculation of ideal beamforming weights. These beamforming weights may need to be shared with each one of the plurality of WTRUs prior to the cooperative transmission. Other information which may need to be shared prior to joint transmission may include an indication of a carrier, a carrier alignment or a capability set of one or more smart antennas. It may be beneficial for each WTRU to exchange a capability set including a smart antenna configuration prior to the joint transmission. This may be of particular relevance to distributed beamformers.

In another example, an amplify-and-forward transmission technique may be used by the cooperating set WTRUs. In such a case, all cooperating set WTRUs may share the soft information they have received from the source. Similar to decode-and-forward embodiments, the sharing of received data may be done by having all cooperating set WTRUs broadcast their received soft information, or by cooperating set WTRUs cooperating to transmit the soft information jointly per destination WTRU. Furthermore, the cooperating set WTRUs may share channel estimation values for their link to the source. Such channel estimation along with the channel estimation of the links between the destination WTRU and cooperating set WTRUs, may be used to improve decoding at the source WTRU.

In an amplify-and-forward embodiment, the WTRUs may be configured with amplification factors to use. The configuration may be included in a sharing transmission grant and may be received in a MAC, radio resource control (RRC) or PLCP layer message. In another embodiment, one or more amplification factors may be semi-statically configured. In another embodiment, the one or more amplification factors may depend on a specific destination WTRU requirements and a preferred value may be indicated by a destination WTRU. In another example, a WTRU may autonomously determine the one or more amplification factors, in one embodiment, as a function of available transmission power.

In another example, compress-and-forward may be used by the cooperating set WTRUs. In such a case, the cooperating set WTRUs may exploit the correlation between their received signals. The sharing of data amongst cooperating set WTRUs and to destination WTRUs may be performed by using source coding with side information at the destination. This may enable an optimal use of sharing resources. Compression may include header compression, payload compression or a combination of header and payload compression. Exemplary compression algorithms include lossy algorithms for video/voice applications. Alternatively, compression algorithms may include lossless algorithms for data applications. Some exemplary compression algorithms which may be employed by embodiments disclosed herein include Lempel-Ziv, Zip, Gif, or the like. The chosen compression algorithms may be negotiated by one or more WTRUs in a cooperative set.

A source node may transmit to a cooperating set using spatial multiplexing. In such a case, the number of transmission layers may be determined as a minimum of the number of antennas on any cooperating set WTRU. This may enable every cooperating set WTRU to be able to attempt detection and decoding of the spatially multiplexed channel. The cooperating set WTRUs may then use any sharing method presented herein to share their received, and potentially decoded, transmissions to appropriate destination WTRUs. In another example, the source node may use a number of spatial layers greater than the number of antennas of at least one cooperating set WTRU. For example, the number of spatial layers may match the total number of receive antennas in the cooperating set. In such a case, decoding may be centralized, such that all cooperating set WTRUs may share soft information with a central decoding node, prior to that node decoding and then sharing the data with the intended destination WTRUs. In another example, all soft information may be shared with all destination WTRUs. Then each destination WTRU may decode its intended data. In another example, distributed decoding may be employed by the cooperating set WTRUs. In such a case, a first cooperating set WTRU may attempt decoding and forward its soft decoded information to a second cooperating set WTRU. The second cooperating set WTRU may use the soft information from the first WTRU along with its received transmission to attempt decoding and may forward its soft decoded information to a third cooperating set WTRU, and so on. Upon successfully decoding of data for at least one destination WTRU, a cooperating set WTRU may share the decoded data with the intended destination WTRU(s).

In an embodiment, full duplex capable WTRUs may be capable of simultaneous transmission and reception of shared data. For example, each source WTRU may be given a set of resources on which it may share its data with cooperating set WTRUs. The set of resources may be sets of symbols (i.e., using TDM), sets of subcarriers (i.e., using FDM) or a combination of the two (i.e., using FDM+TDM or CDM). The capability of full duplex sharing may enable the sharing phase to be reduced in time and, thus, may reduce the over-all latency present in two-phase cooperation.

Non-orthogonal access schemes may be used in the sharing phase. For example, each source WTRU may be assigned a sparse-code multiple access (SCMA) codebook to share its data. Full duplex cooperating set WTRUs using advanced receivers may be able to decode the shared data from other source WTRUs, while sharing their own data using different SCMA resources.

A cooperating set of WTRUs may transmit data to a destination, for example, to an eNB, using different cooperative transmission modes. The cooperative transmission modes may be configurable, and in one embodiment occur dynamically, for example, in an enhanced UL grant or a grant specifically for cooperative transmission, or in another embodiment may occur semi-statically. Examples of cooperative transmission modes are provided below.

Distributed space-time block code (STBC) transmission is an example of a cooperative transmission mode. In this transmission mode, diversity gain may be maximized. After sharing data among a cooperating set of WTRUs, the WTRUs may construct a STBC as if their antenna ports are a subset of the over-all transmitting system. For example, if WTRU i has $n_i$ transmit antenna ports, a cooperating set S has in total $n_T = \Sigma_{i \in S} n_i$ transmit antenna ports. It should be noted that depending on the total number of transmit antenna ports $n_T$, the maximum rate achievable by STBC may vary. The maximum rate achievable is determined by $$r = \frac{n_T + 2}{2n_T}.$$

Therefore the length of a STBC may depend on the size of the cooperating set and the number of source WTRUs transmitting data within the set. For example, if a set of 2 WTRUs is present, each with 1 transmit antenna ($n_T=2$), then the maximum rate is $r=1$. In this case the Alamouti code may be used; defined as:

$$C = \begin{bmatrix} c_1 & c_2 \\ -c_2^* & c_1^* \end{bmatrix}, \quad \text{Equation 1}$$

where $c_1$ is a symbol from the first WTRU and $c_2$ is a symbol from the second WTRU. For proper coding, all WTRUs within the cooperating set may be assigned an index that is known to all other WTRUs.

Specific coding structures may be defined for different values of $n_T$ or $n_i$. Note that since $r=1$ is not possible for $n_T>2$, then repetition in time of certain symbols at certain antenna ports may be required. For example for $n_T=3$, the STBC may be defined as:

$$C = \begin{bmatrix} c_1 & c_2 & c_3 \\ -c_2 & c_1 & -c_4 \\ -c_3 & c_4 & c_1 \\ -c_4 & -c_3 & c_2 \\ c_1^* & c_2^* & c_3^* \\ -c_2^* & c_1^* & -c_4^* \\ -c_3^* & c_4^* & c_1^* \\ -c_4^* & -c_3^* & c_2^* \end{bmatrix}. \quad \text{Equation 2}$$

In some STBC constructions, there may not be a one-to-one mapping of a number of transmitted information symbols to a number of transmit antennas. Therefore, there may not be an even distribution of symbols to a number of WTRUs. For example, if the STBC for $n_T=3$, there are four information symbols ($c_1$, $c_2$, $c_3$ and $c_4$). If it is assumed that three WTRUs, each with a single antenna, form the distributed $n_T$ transmit antennas, then one WTRU may be allowed to transmit two information symbols to the other WTRUs single information symbol. To even out the number of information symbols, the mapping of each $c_i$ to a cooperating set WTRU may be per subcarrier or per resource block (RB). For example in a first subcarrier, $c_1$ is a symbol for a first WTRU, $c_2$ is a symbol for a second WTRU, $c_3$ and $c_4$ are symbols for a third WTRU. In a second subcarrier, $c_1$ is a symbol for a first WTRU, $c_2$ and $c_4$ are symbols for a second WTRU, $c_3$ is a symbol for a third WTRU. In a third subcarrier, $c_1$ and $c_4$ are symbols for a first WTRU, $c_2$ is a symbol for a second WTRU, $c_3$ is a symbol for a third WTRU. The mapping of symbols to WTRUs, in an embodiment, per subcarrier or per PRB or per subframe, in the STBC may be done semi-statically, for example, upon formation of a cooperating set, or upon configuration of a cooperative transmission mode, or upon reconfiguration of cooperating set. In another example, the mapping of symbols to WTRUs may be done dynamically, for example, as part of an UL grant. Furthermore, the mapping of distributed antenna ports to WTRU-specific antenna ports may be done semi-statically, for example, upon formation of a cooperating set, or upon configuration of a cooperative transmission mode, or upon reconfiguration of cooperating set. In another example, the mapping of distributed antenna ports to WTRU-specific antenna ports may be done dynamically, in one embodiment, as part of an UL grant.

Quasi-orthogonal STBCs may be used in a distributed manner to provide partial diversity gain while achieving full rate. Q-STBCs may thus have a simple one-to-one mapping of information symbol to WTRU-specific antenna port number. For example a Q-STBC for $n_T=4$ may use four information symbols. Therefore, each WTRU may be designated with an information symbol per antenna port.

Distributed beamforming is another example of a cooperative transmission mode. In this case, the data from all the source WTRUs may be concatenated into a configurable number of layers, for example, one or two layers. Every WTRU of a cooperating set may use appropriate precoding of the layer(s) on its antenna ports. The distributed precoding may be indicated to the WTRUs dynamically, in one embodiment, in an UL grant for cooperative transmission. In another example, the distributed precoding may vary over time in a pre-determined pattern, known to all cooperating set WTRUs.

Distributed MIMO is another example of a cooperative transmission mode. In such a method, the source WTRU's data may each be assigned to a specific layer. The layer to antenna port mapping may be configured in a way to ensure a source WTRU does not retransmit any of its data on its WTRU-specific antenna ports in the cooperation phase. Furthermore, the layer to antenna port mapping may vary over time, and may be varied in a configurable manner. This embodiment may enable an increase in diversity at the destination, if the destination is able to receive data transmitted during the sharing phase. Furthermore, this embodiment may provide the best coding rate. For example, if every source WTRU has x symbols to transmit, then distributed MIMO would require 16 OFDM symbols in total for that WTRU, for example, 8 OFDM symbols in the sharing phase and 8 OFDM symbols in the cooperation phase. Alternatively, a disproportionate number of OFDM symbols may be used in the sharing phase than the cooperation phase. A disproportionate number of symbols may allow for different modulation and coding rates to be used for each phase. It may be beneficial to include additional redundancy in one of the sharing or cooperation phase.

Another example of a cooperative transmission mode may be referred to as a distributed retransmission mode. Here, the cooperative WTRUs may decode the shared data and re-encode the data for cooperative transmission. The encoder used for cooperative transmission may be the same as that used for shared transmission. Alternatively, the encoder used for cooperative transmission may be different than that used for shared transmission. For example, the cooperative transmission may use a different redundancy version than that used in the sharing phase.

In an example, a destination node, for example, an eNB, may receive a transmission from a source WTRU during the sharing phase. The destination may then determine if it has successfully decoded the data. If the data has been successfully decoded, the destination may transmit an ACK to the source WTRU and, in one embodiment, to the cooperating WTRUs. If it has not successfully decoded the data, the destination may transmit a negative acknowledgement (NACK) to the source WTRU and, in one embodiment, to the cooperating WTRUs. If a NACK is received by the cooperating WTRUs, then the cooperative phase may take place. Furthermore, the cooperative phase may enable transmission of different redundancy versions.

Cooperating set WTRUs may listen or monitor for and attempt to decode transmissions and/or retransmissions from one or more source WTRUs. Upon successfully decoding a transmission, in one embodiment, by using the accumulated transmissions, a cooperating set WTRU may partake in cooperative transmission of a future retransmission. For example, a first transmission may be from a source WTRU, a first retransmission may be by the source WTRU as well as any cooperating set WTRU that successfully decoded the first transmission, the next retransmission may be by the source WTRU and cooperating set WTRUs that successfully decoded the first transmission and any other cooperating set WTRUs that successfully decoded after the first retransmission, and so on. This may continue until the destination transmits an ACK.

Figure 6:
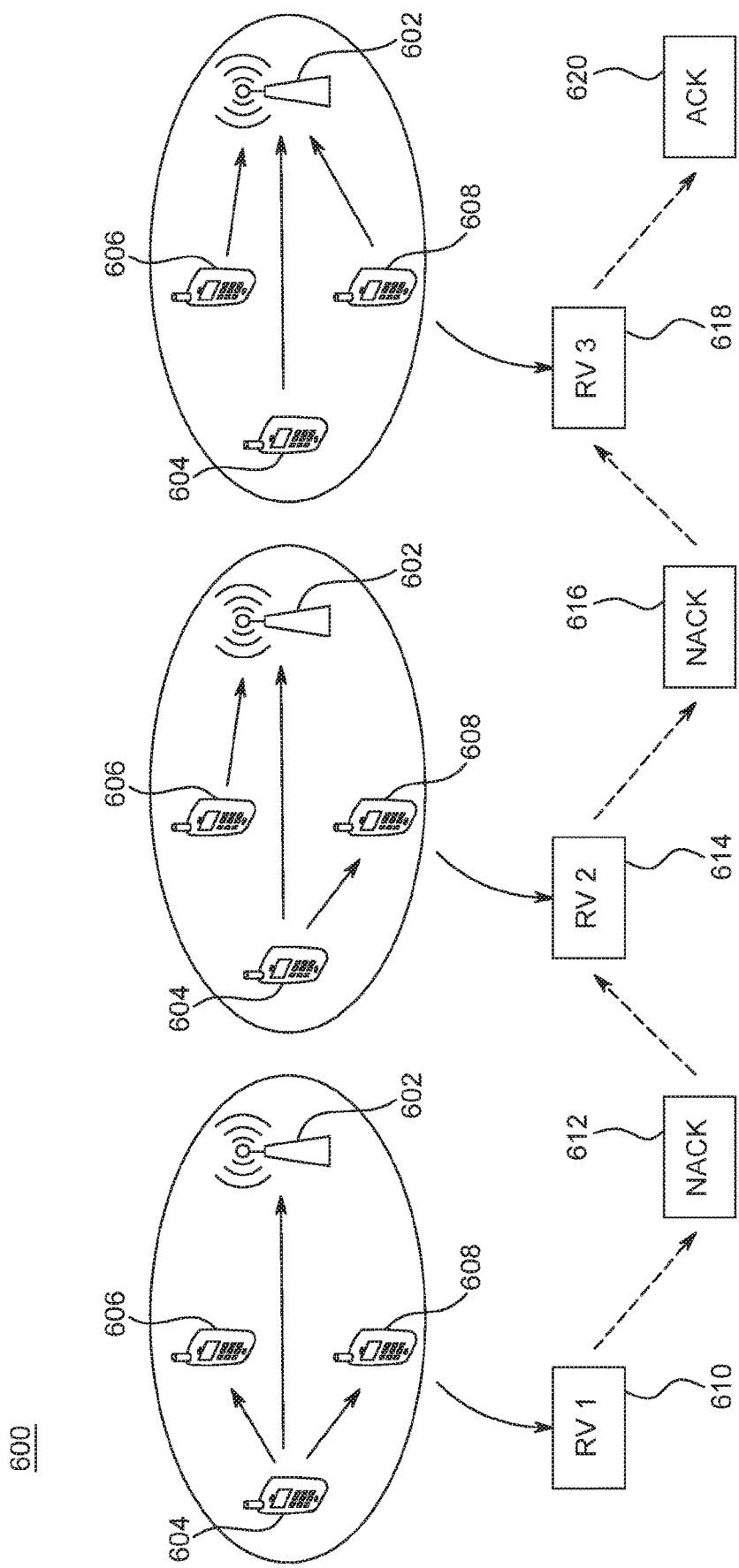
FIG. 6 shows an example of a set of WTRUs cooperating to transmit data for a single source WTRU.
Figure 7A:
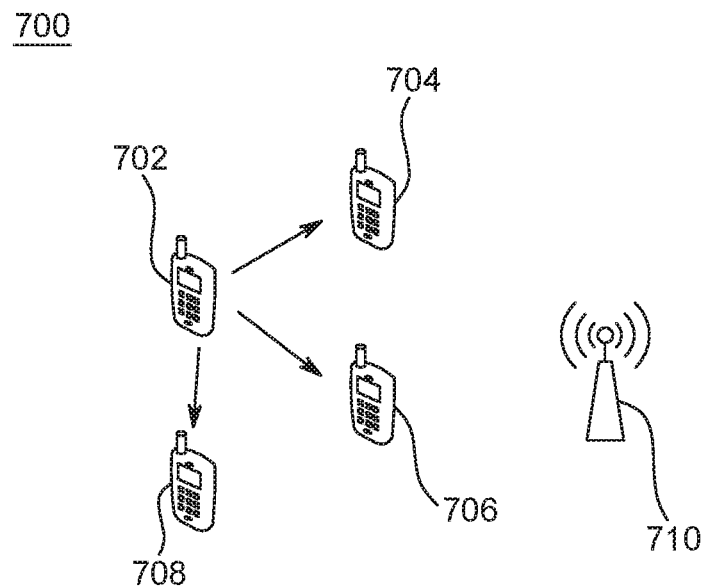
FIG. 7A shows an example of WTRUs sharing data during a sharing transmission phase.
Figure 7B:
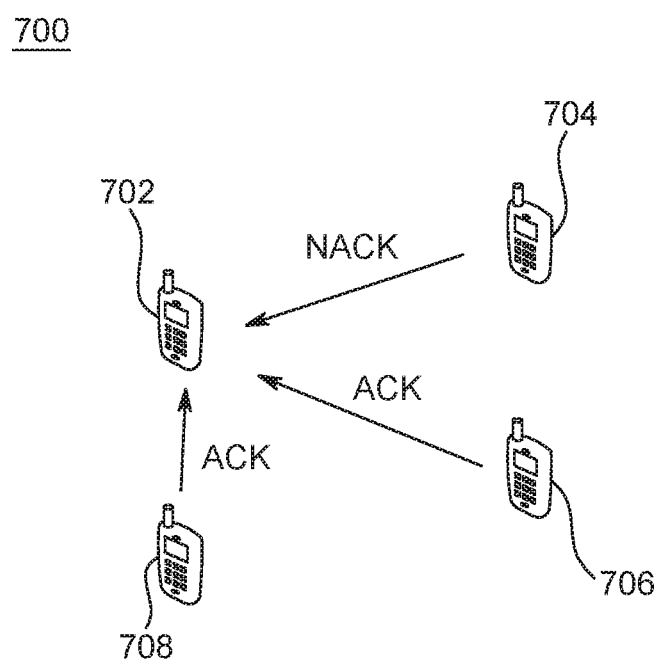
FIG. 7B shows the WTRUs of FIG. 7A acknowledging receipt of the sharing data.
Figure 7C:
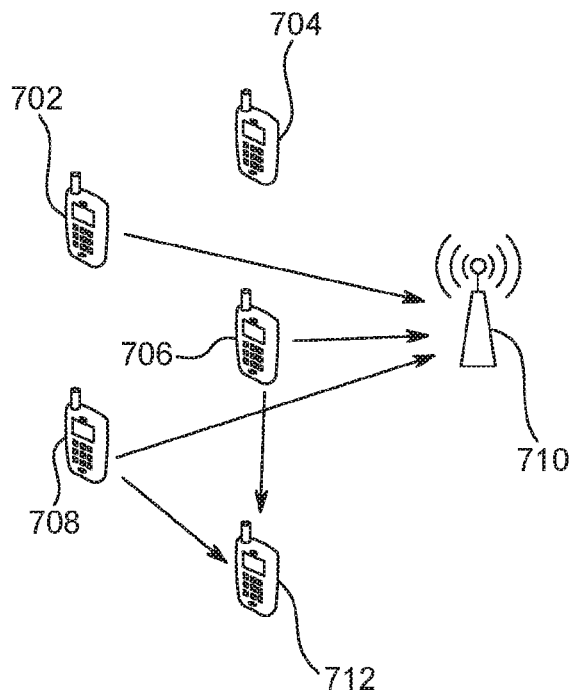
FIG. 7C shows a subset of the WTRUs of FIG. 7B retransmitting the sharing data to an eNB.
Figure 7D:
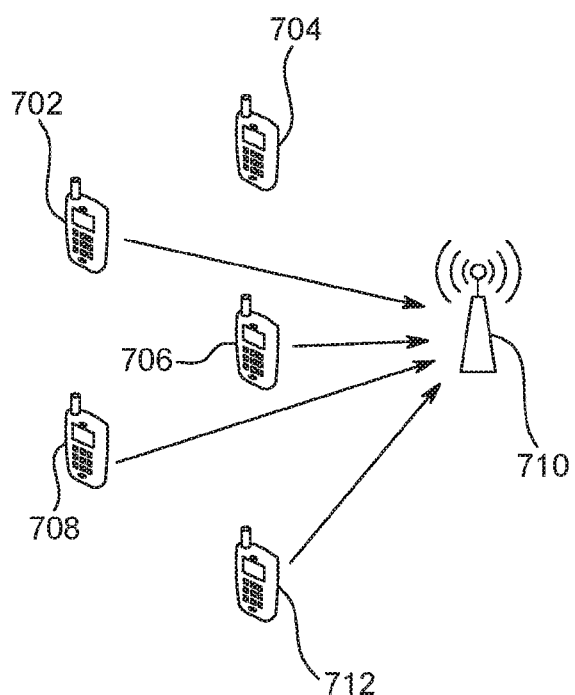
FIG. 7D shows an example of the WTRUs of FIG. 7C redundantly retransmitting the sharing data to an eNB using a joint transmission method.

FIG. 6 shows an example of distributed retransmissions, where cooperating set WTRUs only participate in retransmissions if they have successfully decoded the transmitted data. FIG. 6 shows of a set of WTRUs 604-608 cooperating to transmit data for a single source WTRU 604. Retransmissions occur until the destination eNB 602 has acknowledged successful reception of the data. In this case, different redundancy versions (RV's) may be transmitted by different sets of cooperating WTRUs. It should be noted that any cooperative transmission may use any of the modes described herein. In a first transmission, a first redundancy version RV 610 is transmitted by WTRU 604 to WTRUs 606-608 and eNB 602. If a NACK 612 is received, WTRU 604 may transmit a second redundancy version RV 614. WTRU 604 may transmit RV 614 along with WTRU 606, where it is assumed in this example that WTRU 606 successfully received the first transmission from WTRU 604 and WTRU 608 did not successfully receive the first transmission from WTRU 604, to both WTRU 608 and eNB 602. In this case, WTRU 608 has another opportunity to successfully receive data. If a NACK 616 is received for RV2 614, a third RV 618 may be used. In RV3 618, WTRUs 606-608 each have successfully received a transmission of data from WTRU 604, and may simultaneously transmit the data to the eNB 602. Although the method demonstrated by RV3 618 may be costly in terms of aggregate transmission power, it provides the most robust transmission available in the network.

For any retransmission occasion, the retransmission may be achieved with a single phase. For example in FIG. 6, for RV2 the WTRUs transmitting may transmit on resources granted by the destination eNB. Additionally, the WTRUs receiving the transmission may be listening on the same resources.

In another example, a retransmission occasion may use a two phase approach. In such a case, a retransmission may be composed of a first phase, where the cooperating set WTRUs that have previously successfully decoded the data and, in one embodiment along with the source WTRU, may transmit on sharing resources, and a second phase, where all cooperating set WTRUs that have previously successfully decoded the data, along with any new cooperating set WTRU that has most recently successfully decoded the data, along with the source WTRU, may transmit on cooperative transmission resources.

An example which further illustrates a cooperative retransmission process is shown in FIG. 7. FIG. 7A illustrates three WTRUs 704-708 in receipt of a data transmission from WTRU 702. Upon receiving a NACK from WTRU 704, a determination may be made that WTRU 704 shall no longer participate in a corresponding cooperative transmission to eNB 710, as illustrated by the absence of an arrow between WTRU 704 and eNB 710 in FIG. 7C. FIG. 7C shows a cooperative transmission whereby a fifth WTRU 712 receives data during the cooperative transmission stage using cooperative transmission resources. Lastly, FIG. 7D shows WTRUs 702 706 708 and 712 retransmitting to eNB 710. It should be noted that since WTRU 704 transmitted a NACK in step B, WTRU 704 was omitted from the transmit group. Alternatively, if WTRU 704 had received a transmission in step C, WTRU 704 may have participated in the transmission shown step D. Since WTRU 712 successfully decoded data in FIG. 7C, WTRU 712 was successfully added as shown in FIG. 7D.

Fountain code retransmission is another example of a distributed retransmission of a cooperative transmission mode. Here, a WTRU may transmit its data using rateless coding, for example, using fountain codes. The WTRU may encode its data into a set of codeblocks, whereby the reception of any set of K correctly decoded codeblocks (from N total transmitted codeblocks) may enable the destination node to properly decode the entire data. It may be possible that a cooperating set WTRU requires fewer total transmitted codeblocks N to obtain K correctly decoded codeblocks, when compared to the destination node eNB. In such a scenario, the sharing phase may be composed of the transmission of $N_1$ transmitted codeblocks. Any cooperating set WTRU that is able to obtain at least K correctly decoded codeblocks (from the $N_1$ transmitted codeblocks) may thus determine the original source WTRU's transmission. Such cooperating set WTRUs may then perform collaborative transmission to the destination node. The collaborative transmission may be the transmission of a set of $N_2$ codeblocks. The $N_2$ codeblocks may all be transmitted by all cooperating set WTRUs. In another example, some or every cooperating set WTRU, in one embodiment, along with the source WTRU, may transmit a subset of the $N_2$ codeblocks, such that the union of all transmitted codeblocks forms the set of $N_2$ codeblocks.

The values of $N_1$ and $N_2$ may be determined based on feedback, or based on link adaptation. For example, $N_1$ may be determined by ensuring that the probability that a best cooperating set WTRU is able to correctly decode at least K codeblocks achieves a certain requirement (say 9 times out of 10). Where a best cooperating set WTRU is one that required the lowest $N_1$ to achieve the decoding probability. $N_1$ may be determined by ensuring that at least S cooperating set WTRUs have a probability of correctly decoding at least K codeblocks that achieves a certain requirement. $N_1$ may be determined by ensuring that all cooperating set WTRUs have a probability of correctly decoding at least K codeblocks that achieves a certain requirement.

The value of $N_2$ may be determined to achieve the appropriate HARQ operating point, for example, such that the probability that a destination node may correctly decode K codeblocks from $N_1+N_2$ transmissions achieves a certain requirement.

In another embodiment, a source WTRU may transmit codeblocks on pre-determined resources. Some or all cooperating set WTRUs may attempt to decode the transmitted codeblocks. Upon correctly decoding K codeblocks, a cooperating set WTRU may begin transmitting the next codeblocks in a joint manner with the source WTRU and any other cooperating WTRU that has previously correctly decoded K codeblocks. The source and cooperating set WTRUs may continue transmitting codeblocks until N total codeblocks are transmitted, where the value of N may be determined to achieve an appropriate HARQ operating point.

A cooperative subframe is provided. A WTRU, for example, a WTRU in a cooperating set, may be configured with transmission parameters for the use of cooperative transmission, or cooperative sharing, or cooperative retransmission. Such parameters may include at least one of a: subframe configuration; set of subbands or bandwidth part; spectrum operating code (SOM); or cooperative C-RNTI. Sets of C-RNTI with different values for sharing or cooperative transmissions are possible. The cooperative C-RNTI may optionally be associated to the cooperative set identifier.

Accordingly, a subframe configuration is provided. A WTRU using cooperation, for example, a source WTRU, destination WTRU or cooperating set WTRU, may be configured with a subframe configuration for cooperation. Such a subframe configuration may be composed of multiple regions, where each subframe region may be defined as a set of symbols within the subframe. For example, a subframe configuration for cooperation may include any combination of: a first region for control information; a second region for the transmission and/or reception of channels used for sharing of data; a third region for channels used for transmitting feedback of the shared data; a fourth region for channels used for cooperative (re)transmission of data; or a fifth region for channels used for transmitting feedback of the cooperative (re)transmission of data.

Some subframe regions may operate on directly adjacent symbols of the cooperative subframe. Otherwise, a guard period, for example, a fraction of a symbol, may separate adjacent regions.

Figure 8:
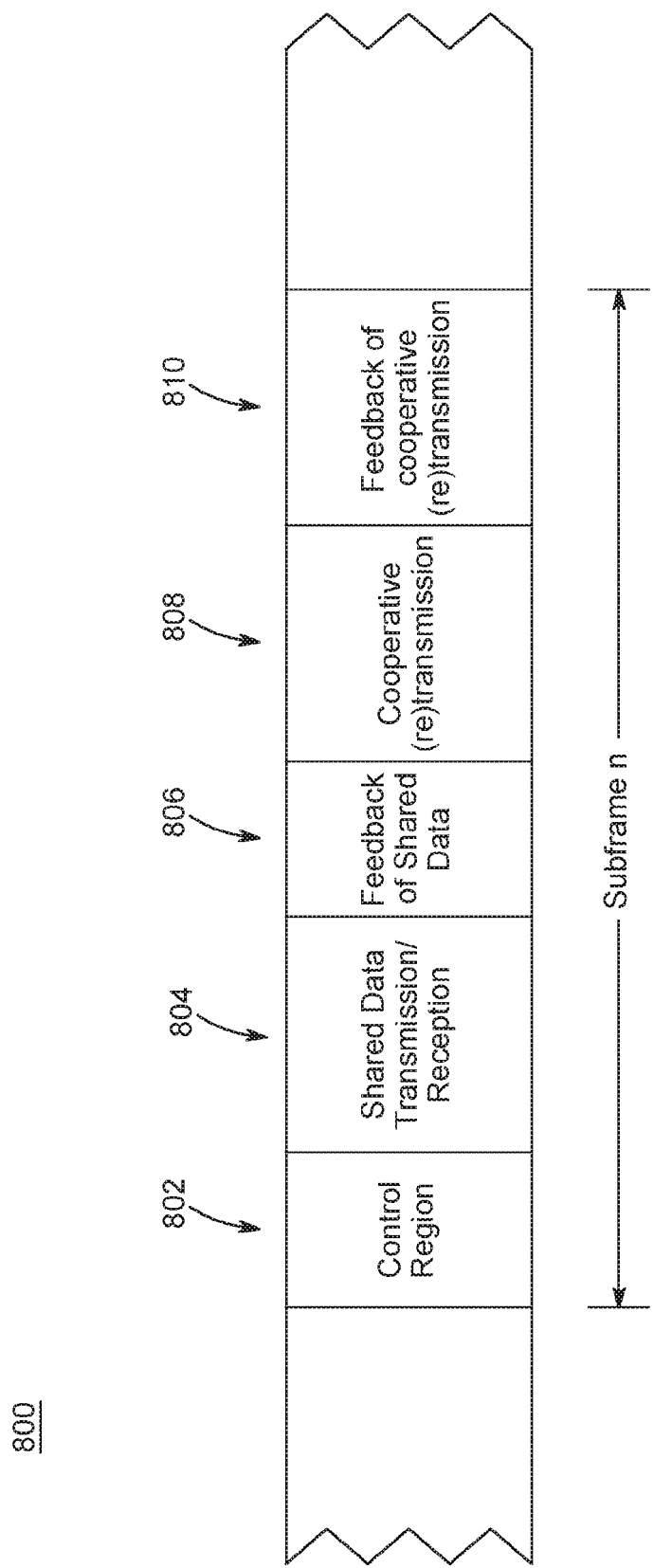
FIG. 8 shows an example of a multi-region cooperative subframe.

FIG. 8 illustrates an example of a multi-region cooperative subframe 800. The exemplary frame includes a control region 802, a shared data transmission/reception region 804, a feedback region 806, a cooperative (re)transmission region 808, and a feedback of cooperative (re)transmission region 810. It should be noted that the exemplary subframe structure may be deviated from in terms of both a total length of time and a length of time corresponding to the individual regions 802-810. The subframe is not drawn to scale, however, the length of time used for data sharing and cooperative (re)transmission is likely to be greater than time devoted to control and feedback. The set of symbols used for the transmission and/or reception of channels used for sharing data may reuse any of the sharing methods explained herein. For example, the regions may be separated in a TDM manner, enabling each source WTRU to share its data in orthogonal resources. In another example, if the WTRUs are capable of full duplex operation, the regions may be separated in a FDM or CDM/TDM+FDM (including methods such as SCMA) manner. In such an embodiment, each source WTRU may be assigned one set of subcarriers and symbols, or one CDM code for transmission of data, and a set of subcarriers and symbols, or a set of CDM codes for reception of data.

The set of symbols used for transmitting feedback of the shared data may be separated in a TDM, FDM, FDM+TDM, CDM or non-orthogonal multiple access (e.g., SCMA) manner. Each resource may be tied to a source WTRU's transmission. In one embodiment, one or more cooperating set WTRUs may use a source WTRU's resource in the region to transmit ACK of successful reception. In such an embodiment, a NACK may be implicitly determined by detecting a lack of transmission on the resource. A WTRU may listen to the resource within this region assigned to its shared transmission to determine if any other cooperating set WTRU has successfully decoded its shared data. If multiple cooperating set WTRUs have successfully decoded a WTRU's shared data, they may all transmit an ACK, using joint transmission methods or in a cooperative manner. The reception of an ACK by a source WTRU may indicate to the source WTRU that its data will be retransmitted in a cooperative manner.

For the region used for cooperative (re)transmission of data, a WTRU may: retransmit only its own data; transmit a cooperating set data in a cooperative manner, or remain silent. When a WTRU retransmits only its own data, the retransmission may use a different redundancy version. The WTRU may select this option if it is not a cooperating set WTRU and only a source WTRU. The WTRU may select this option if it is a cooperating set WTRU and has not successfully decoded the shared transmissions of any other source WTRUs. The WTRU may select this option if it is a cooperating set WTRU and no other cooperating set WTRUs has successfully decoded its shared transmission.

The WTRU may select the option to transmit cooperating set data in a cooperative manner if the WTRU is a cooperating set WTRU and has successfully decoded the shared transmission of at least one other source WTRU.

The WTRU may select the option to remain silent if the WTRU does not have any data to (re)transmit and if it is unable to successfully decode the shared transmission of at least one other source WTRU.

For example, two-phase cooperation methods may be achieved in a TDM manner. This may add latency to the over-all transmission. In order to reduce the latency, two-phase cooperation may be performed on a time-slot basis. A WTRU may share its data in a first time slot of a subframe, and cooperative transmission may occur in a second time slot of, and in one embodiment, the same, subframe.

A WTRU may be granted sharing resources which indicate a specific time slot in which the WTRU may share data with cooperating set WTRUs. The sharing grant may be transmitted from the destination eNB. Furthermore, the sharing grant may be received by some or all WTRUs in the cooperating set, in order to determine the resources in which the source WTRU may share data. There may be a cooperative UL grant indicating to the cooperating set WTRUs the resources (including the time slot) where the source data's WTRU may be shared. In an example, the time-slot sharing grant and the time-slot cooperative grant may be combined into a single enhanced UL grant.

Methods for simultaneous sharing and cooperation are provided. In an example, the different regions of a cooperative subframe may not be completely orthogonal. The length of each region may be fixed and/or the same for all cooperating set WTRUs, or the length of each phase may be different for each WTRU and determined by at least one of: whether a cooperating set WTRU has decoded one source WTRU's shared data; whether a cooperating set WTRU has decoded more than one source WTRU's shared data, for example, whether a cooperating set WTRU has decoded all source WTRUs' data, or whether a cooperating set WTRU has decoded a pre-determined set of source WTRUs' shared data, or whether a cooperating set WTRU has decoded a pre-determined number of source WTRU's data; if a source WTRU's shared data has been decoded by at least one cooperating set WTRU, the source WTRU may end the sharing phase; a configuration received by a higher layer; or based on results of measurements. For example, a WTRU may determine, based on measurements that it needs to share its data for a certain length of time, or over a certain set of resources.

In one embodiment, the time at which different cooperating set WTRU's begin the cooperative phase need not be the same for all cooperating set WTRUs. Therefore, there may be overlap between the sharing region of a first cooperating set WTRU and the cooperating region of a second cooperating set WTRU.

This embodiment may also be applicable to the use of legacy subframes. For example in some implementations, a sharing phase may last multiple subframes, and be followed by a cooperative phase that may also last multiple subframes. The length of each phase may be fixed or variable based on similar criterion as listed herein for cooperative subframes.

Simultaneous sharing and cooperation may be achieved by assigning different multiple access resources, in one embodiment, the same subframe, for sharing and cooperative (re)transmissions. Such multiple access resources may be orthogonal or non-orthogonal, for example using SCMA. For example, a cooperating set WTRU may use a first SCMA codeword or spreading sequence to share its data and at an appropriate time, it may use a second SCMA codeword or spreading sequence to cooperatively transmit data it has decoded from other source WTRUs. The WTRU may continue sharing data when the WTRU begins cooperative transmission, for example, in one embodiment, by still using the first SCMA codeword or spreading sequence.

Methods of cooperative precoding are provided. For example, DL cooperative reception feedback and UL cooperative transmission precoding are provided. In the case of DL cooperative reception feedback, a WTRU, for example, a destination WTRU that is not a cooperating set WTRU, may feedback CSI to an eNB based on non-cooperative reception hypotheses. For example, a WTRU may be configured with periodic and aperiodic feedback reports of different CSI processes. One or more of the configured CSI processes may enable CSI feedback for a link between a cooperating set and the destination WTRU. Such a configuration may be transparent to a WTRU. The cooperating set CSI process may require a configuration of a cooperating set reference signal.

A cooperating set WTRU, for example, a WTRU that may or may not be a destination WTRU, may feedback CSI to an eNB based on cooperative reception hypotheses. Such a feedback report may be determined in a distributed manner by some or all cooperating set WTRUs. For example, each WTRU may determine a preferred set of transmission parameters by the eNB, for example, rank, channel quality indicator (CQI), precoder, or the like, and may each feedback the appropriate feedback reports. In another example, the determination of a feedback report may be done in a centralized manner. For example, the cooperating set WTRUs may share measurements taken on signals including configured reference signals. One or more central nodes, for example, one or more cooperating WTRUs, may compute the feedback reports. The feedback reports may be transmitted by the one or more WTRU(s) that computed the feedback report. In another example, the feedback reports may be transmitted by one or more feedback reporting node(s) within a cooperating set. For this embodiment, sharing of the feedback reports may be required prior to feeding back the reports to the eNB.

In the case of UL cooperative transmission precoding, in instances where an UL cooperating set is known to a destination eNB, the UL cooperating grant may indicate to the cooperating set the appropriate cooperative transmission precoders to use. On the other hand, for cases where the eNB is not aware of the cooperating set for a WTRU, or even aware of the use of cooperation, the cooperating set WTRUs may select the precoding. The cooperating set WTRU may use precoder information of a source WTRU. Any source WTRU within a cooperating set may be provided an UL grant for its own transmission. The WTRUs may use the precoder information for its own transmission, possibly along with any cooperative transmission done within a scheduling period. A scheduling period may be interpreted as the time period encompassing all subframes from the moment an UL grant is received to the moment cooperative transmission of the UL grant is performed.

For example, a WTRU may receive an UL grant in subframe n, share its data in subframe $n+k_1$, and the cooperating set may cooperatively transmit in subframe $n+k_1+k_2$. A cooperating set WTRU may use a precoder obtained for any of its own UL transmission within the window of n to $n+k_1+k_2$ for a cooperative transmission in subframe $n+k_1+k_2$. The cooperating set WTRUs may cycle through a set of possible precoders for different cooperative transmission. The set of possible precoders may be configured, in one embodiment, by the eNB.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A first wireless transmit/receive unit (WTRU) configured for multiple phase cooperative data transmission, the first WTRU comprising:
 a receiver configured to receive, by the first WTRU from an evolved Node B (eNB), cooperative set configuration information including a cooperating set specific radio network identifier (C-RNTI);
 the receiver further configured to receive, by the first WTRU from the eNB, a resource assignment for a first data transmission corresponding to a sharing phase;
 a transmitter configured to transmit the first data transmission during the sharing phase, using resources indicated in the received resource assignment and the received C-RNTI;
 on a condition the first data transmission is successfully received by at least a second WTRU and the first data transmission is not successfully received by the eNB, the transmitter is configured to transmit a second data transmission, in cooperation with the second WTRU, during a cooperative transmission phase using a first redundancy version; and
 on a condition the first data transmission is not successfully received by the second WTRU and not successfully received by the eNB, the transmitter is configured to transmit a third data transmission during the cooperative transmission phase using a second redundancy version;
 wherein the first redundancy version and the second redundancy version are different redundancy versions.

2. The first WTRU of claim 1, wherein the first data transmission is transmitted to the eNB.

3. The first WTRU of claim 1, wherein the receiver is further configured to receive a fourth data transmission, from a third WTRU, during the sharing phase.

4. The first WTRU of claim 1, further comprising:
 the receiver is further configured to receive, from the eNB, a control message with an indication of the at least one determined time instances corresponding to the first data transmission.

5. The first WTRU of claim 1, further comprising:
 the receiver is further configured to receive, from a cooperating set master, a control message with an indication of at least one determined time instance of the first data transmission.

6. The first WTRU of claim 1, further comprising:
 the receiver is further configured to receive feedback information comprising an acknowledgement or negative acknowledgement corresponding to the first data transmission.

7. A first wireless transmit/receive unit (WTRU) configured for multiple phase cooperative data transmission, the first WTRU comprising:
 a receiver configured to receive cooperative set configuration information including a cooperating set specific radio network identifier (C-RNTI);
 the receiver further configured to receive a first data transmission, from a second WTRU, during a sharing phase, using the received C-RNTI and a first redundancy version; and
 a transmitter configured to, on a condition the first data transmission is successfully received by the receiver and is not successfully received by an eNB, transmit a second data transmission, in cooperation with the second WTRU, during a cooperative transmission phase, using a second redundancy version;
 wherein the first redundancy version and the second redundancy version are different redundancy versions.

8. The first WTRU of claim 7, wherein the receiver is further configured to receive a resource assignment for the first data transmission.

9. The first WTRU of claim 7, wherein the first data transmission is received in accordance with the received resource assignment.

10. The first WTRU of claim 7, wherein the first data transmission is transmitted to the eNB.

11. The first WTRU of claim 7, wherein the receiver is further configured to receive a third data transmission, from a third WTRU, during the sharing phase.

12. The first WTRU of claim 7, further comprising:
 the receiver is further configured to receive feedback information comprising an acknowledgement or negative acknowledgement corresponding to the first data transmission.

13. The first WTRU of claim 7, further comprising:
 the receiver is further configured to receive a control message with an indication of the at least one determined time instance corresponding to the first data transmission.

14. The first WTRU of claim 13, wherein the receiver is further configured to receive the control message from a cooperating set master.

15. An evolved Node B (eNB) configured for multiple phase cooperative data transmission, the eNB comprising:
 a transmitter configured to transmit cooperative set configuration information including a cooperating set specific radio network identifier (C-RNTI);
 a receiver further configured to receive a first data transmission, from a first WTRU, during a sharing phase, using the transmitted C-RNTI and a first redundancy version; and
 the receiver is further configured to, on a condition the first data transmission is not successfully received by the eNB but is successfully received by a second WTRU, receive a second data transmission, from the first WTRU and the second WTRU, during a cooperative transmission phase, using a second redundancy version;
 wherein the first redundancy version and the second redundancy version are different redundancy versions.

16. The eNB of claim 15, wherein the transmitter is further configured to transmit a resource assignment for the first data transmission.

17. The eNB of claim 15, wherein the first data transmission is received in accordance with the received resource assignment.

18. The eNB of claim 15, wherein the first data transmission is transmitted to the eNB.

19. The eNB of claim 15, further comprising:
the transmitter is further configured to transmit a negative acknowledgement in response to unsuccessfully receiving the first data transmission.

* * * * *